June 2, 1942.   R. W. FLETCHER   2,285,153
ADDING, SUBTRACTING, AND ACCOUNTING MACHINE
Filed July 11, 1936   13 Sheets-Sheet 1
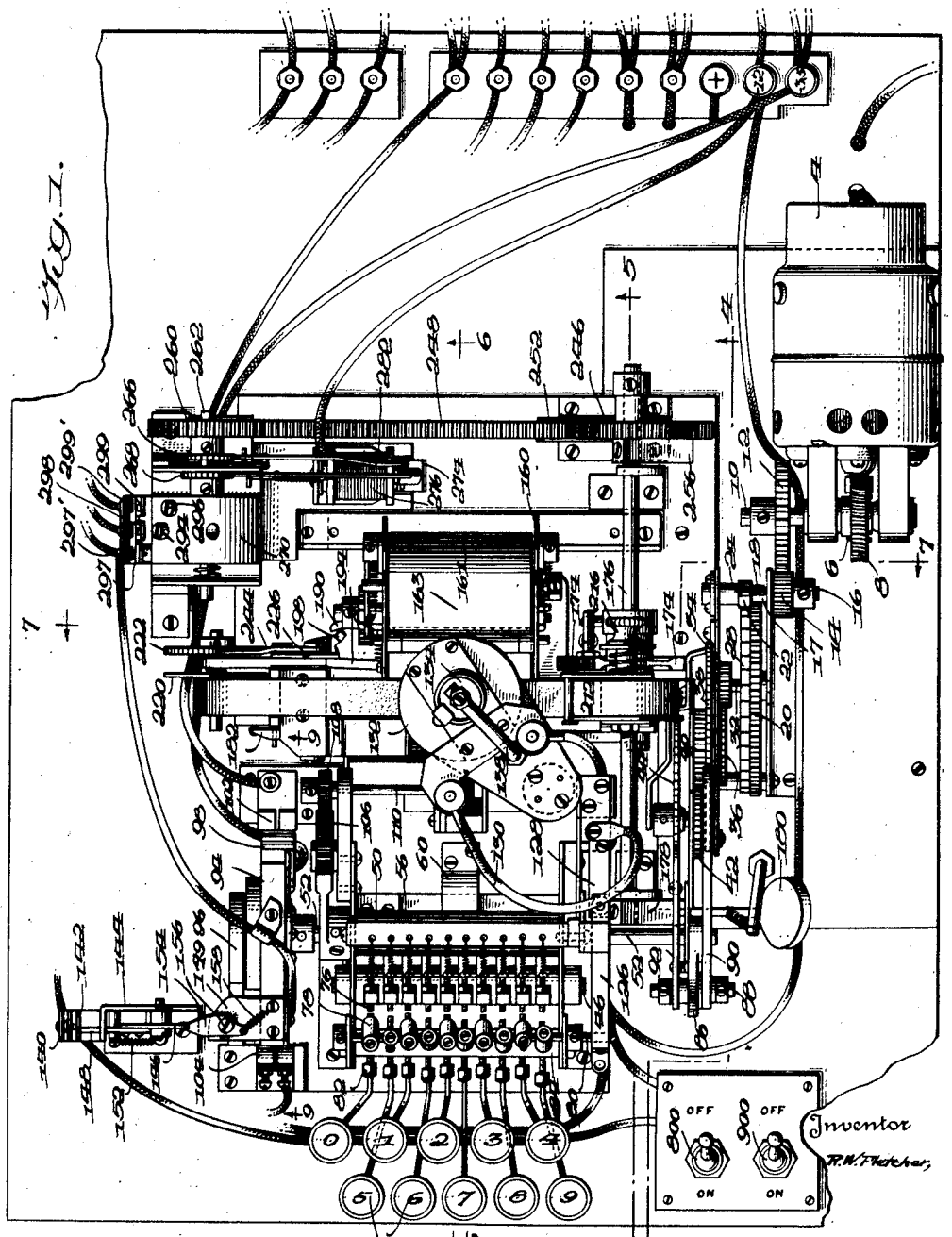

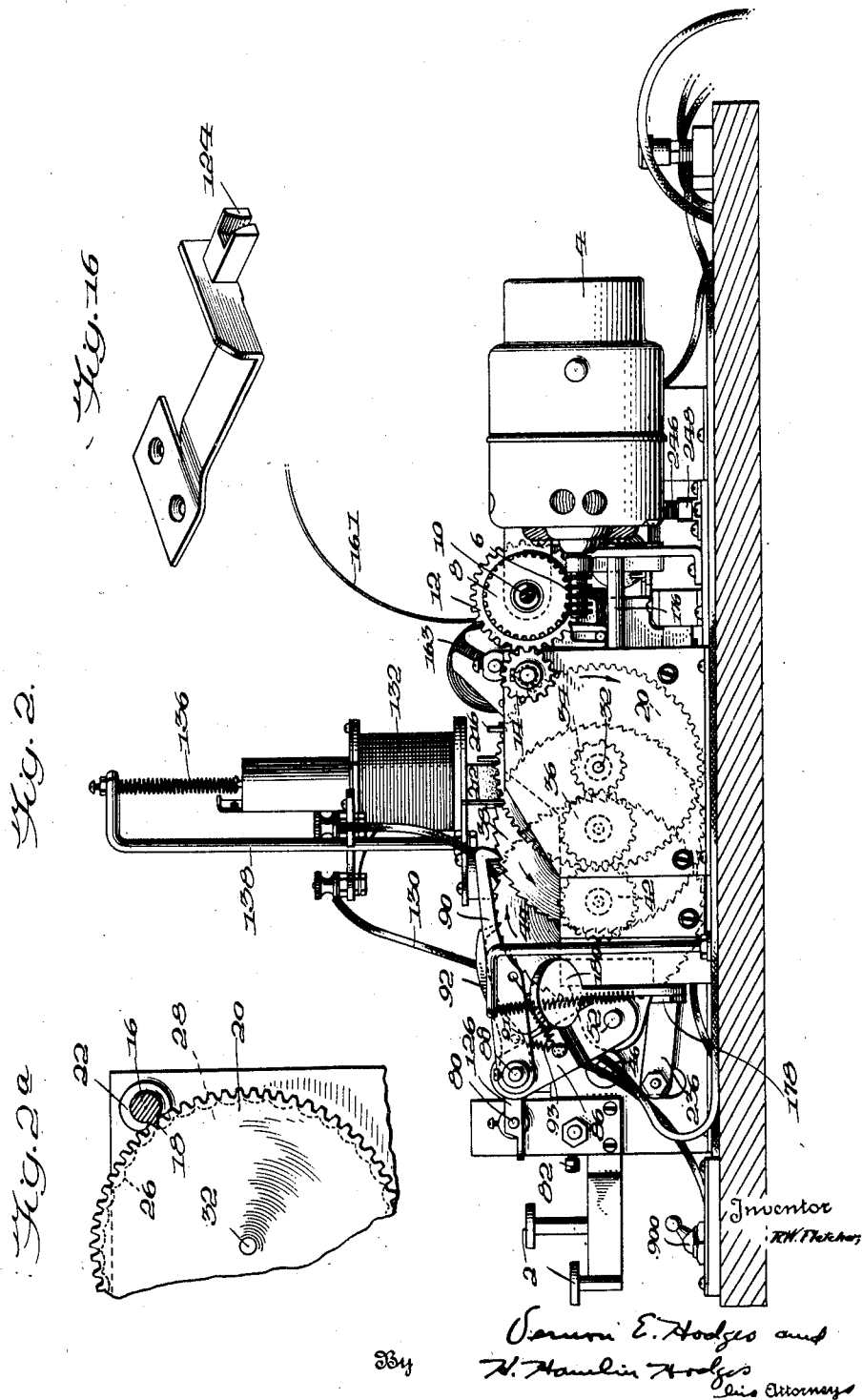

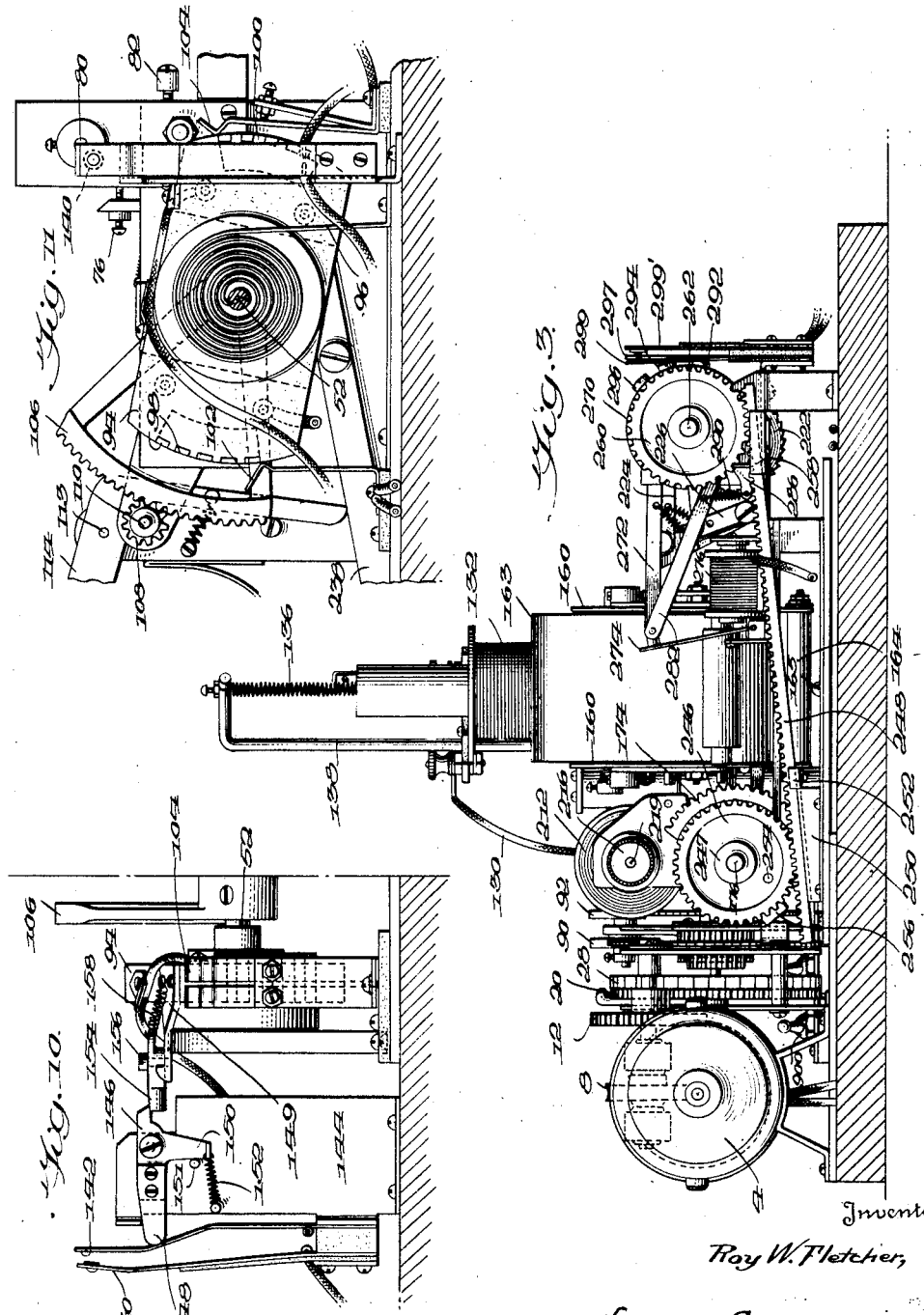

June 2, 1942. R. W. FLETCHER 2,285,153
ADDING, SUBTRACTING, AND ACCOUNTING MACHINE
Filed July 11, 1936 13 Sheets-Sheet 4
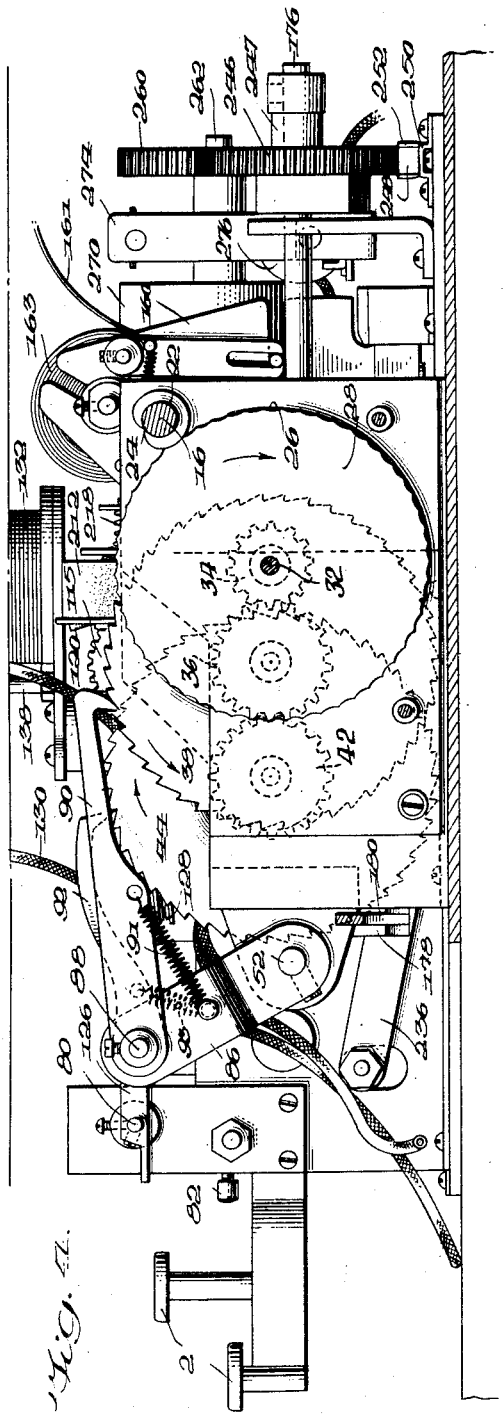
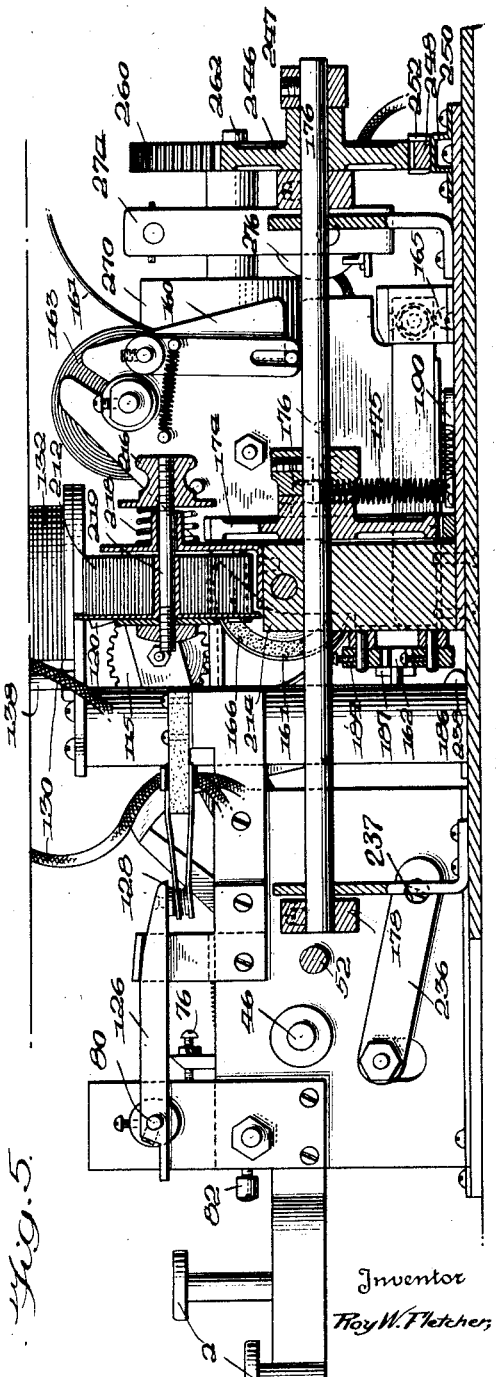
Inventor
Roy W. Fletcher
By Vernon E. Hodges and
W. Hamlin Hodges
his Attorneys

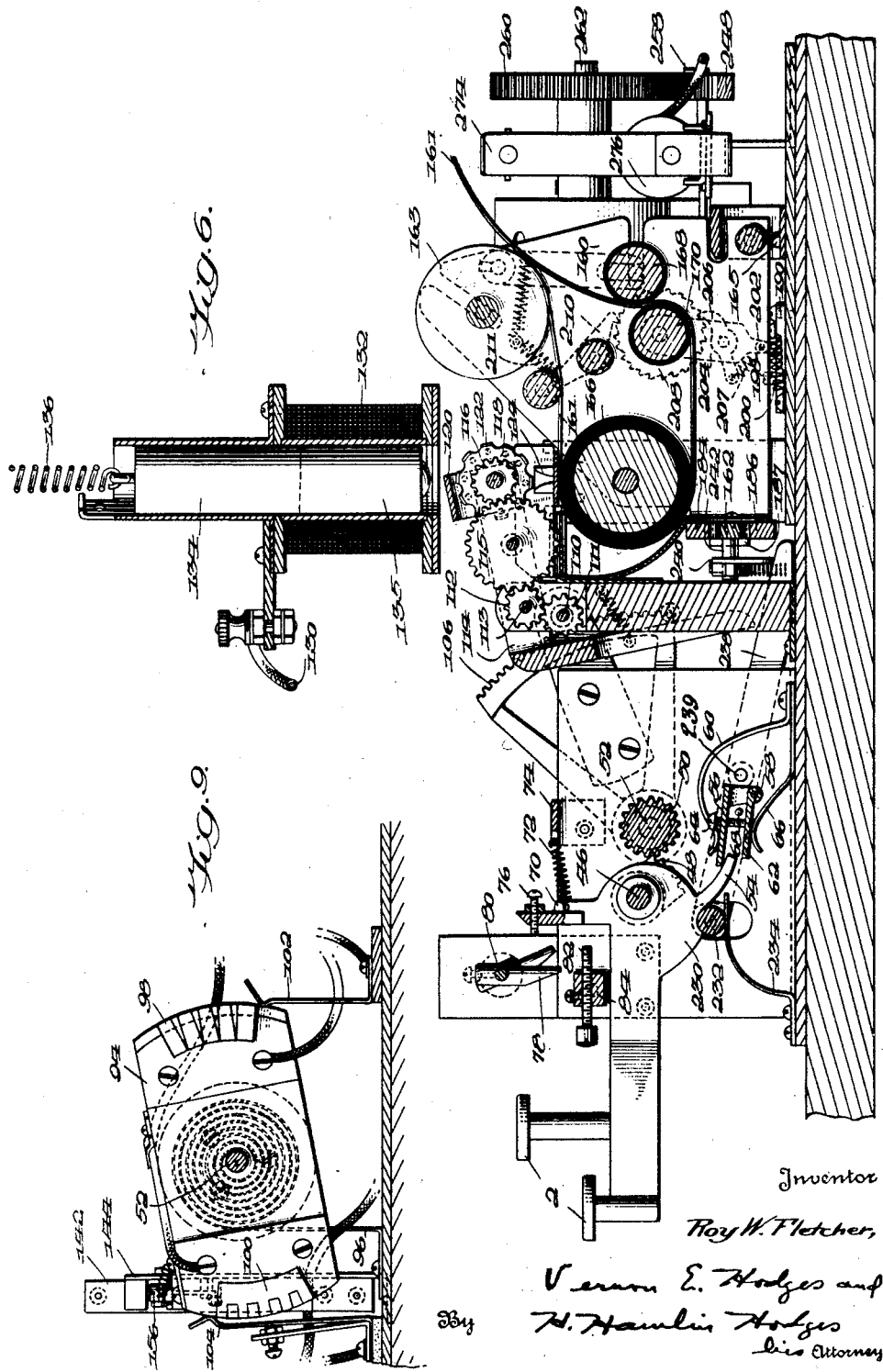

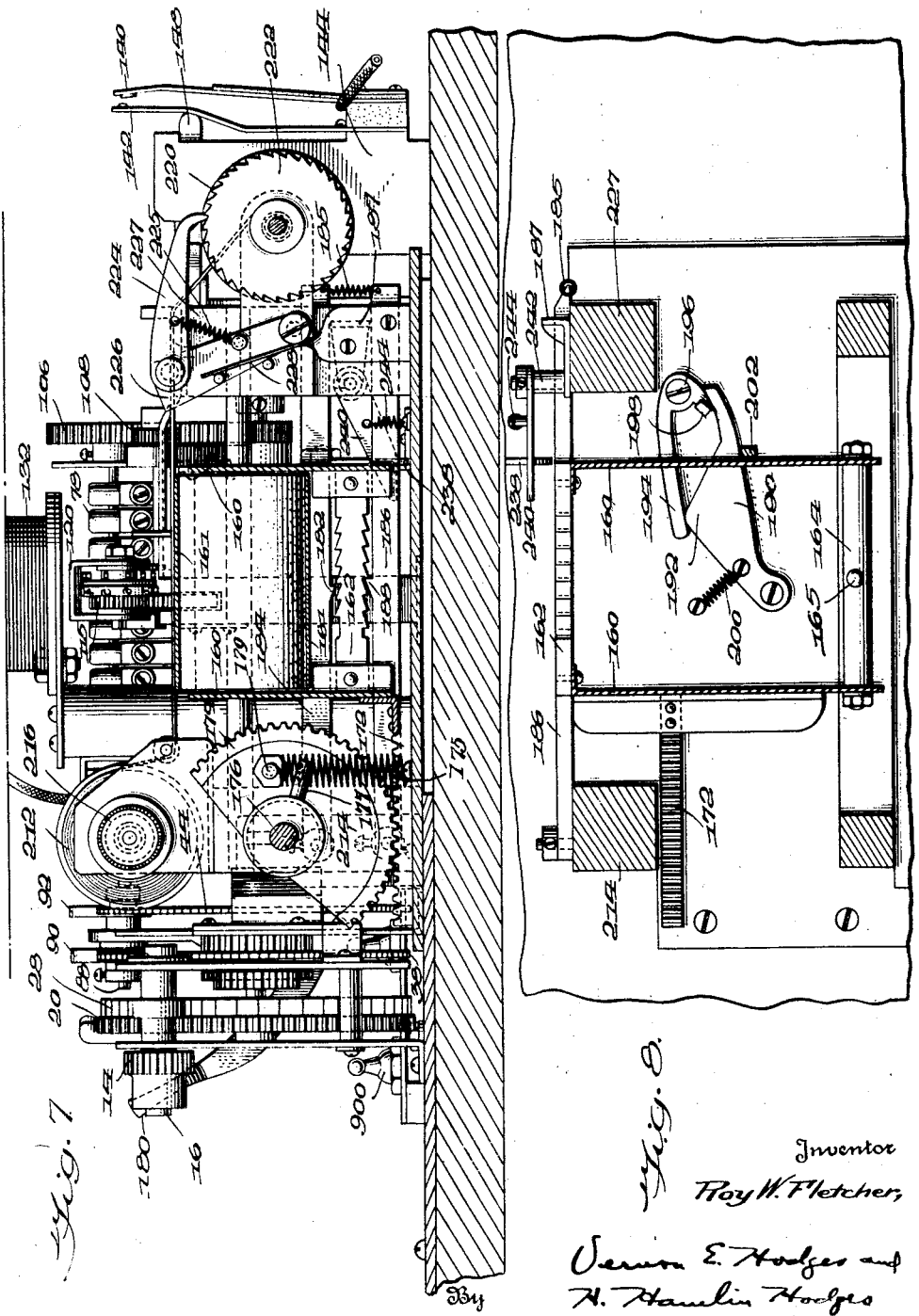

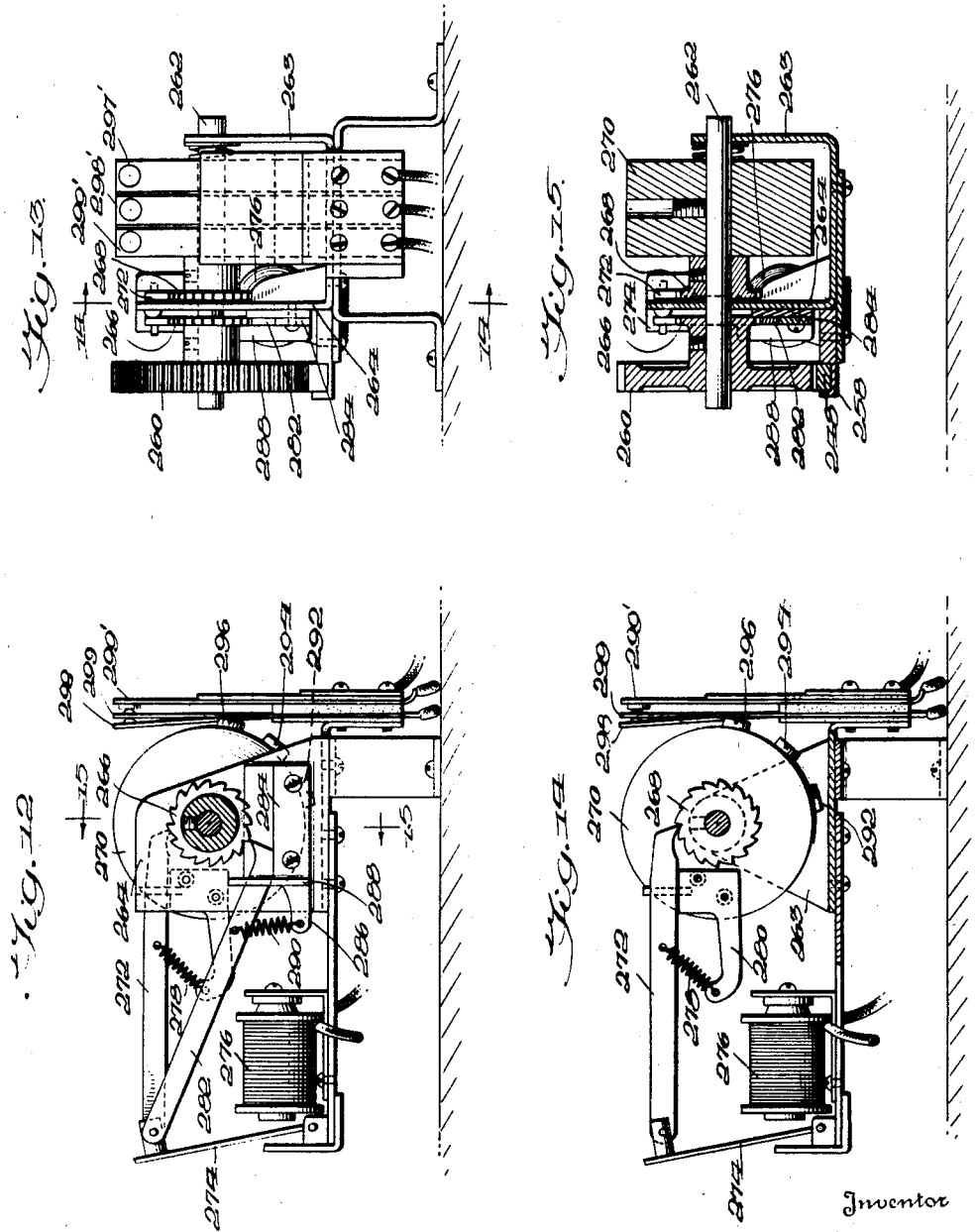

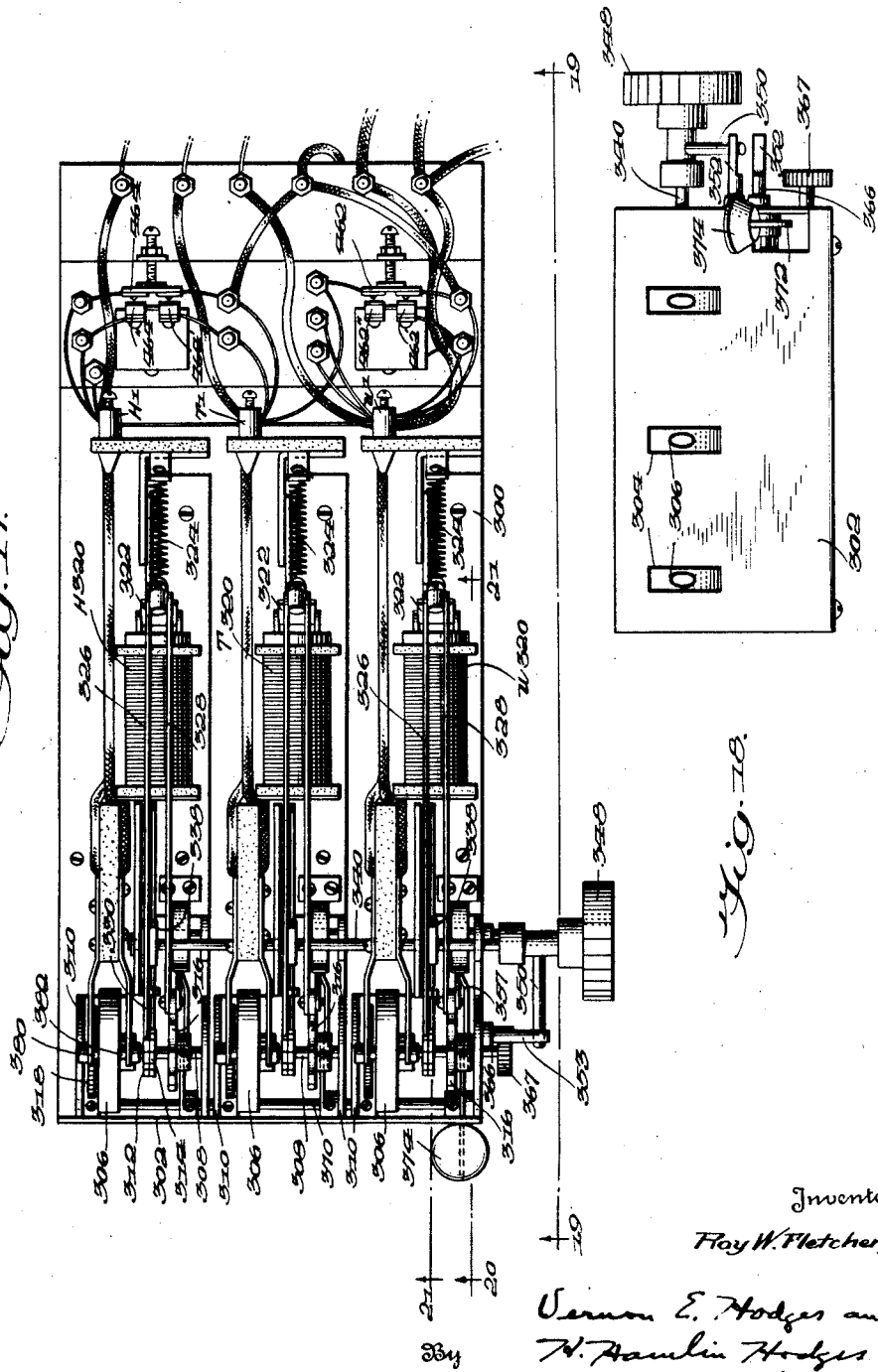

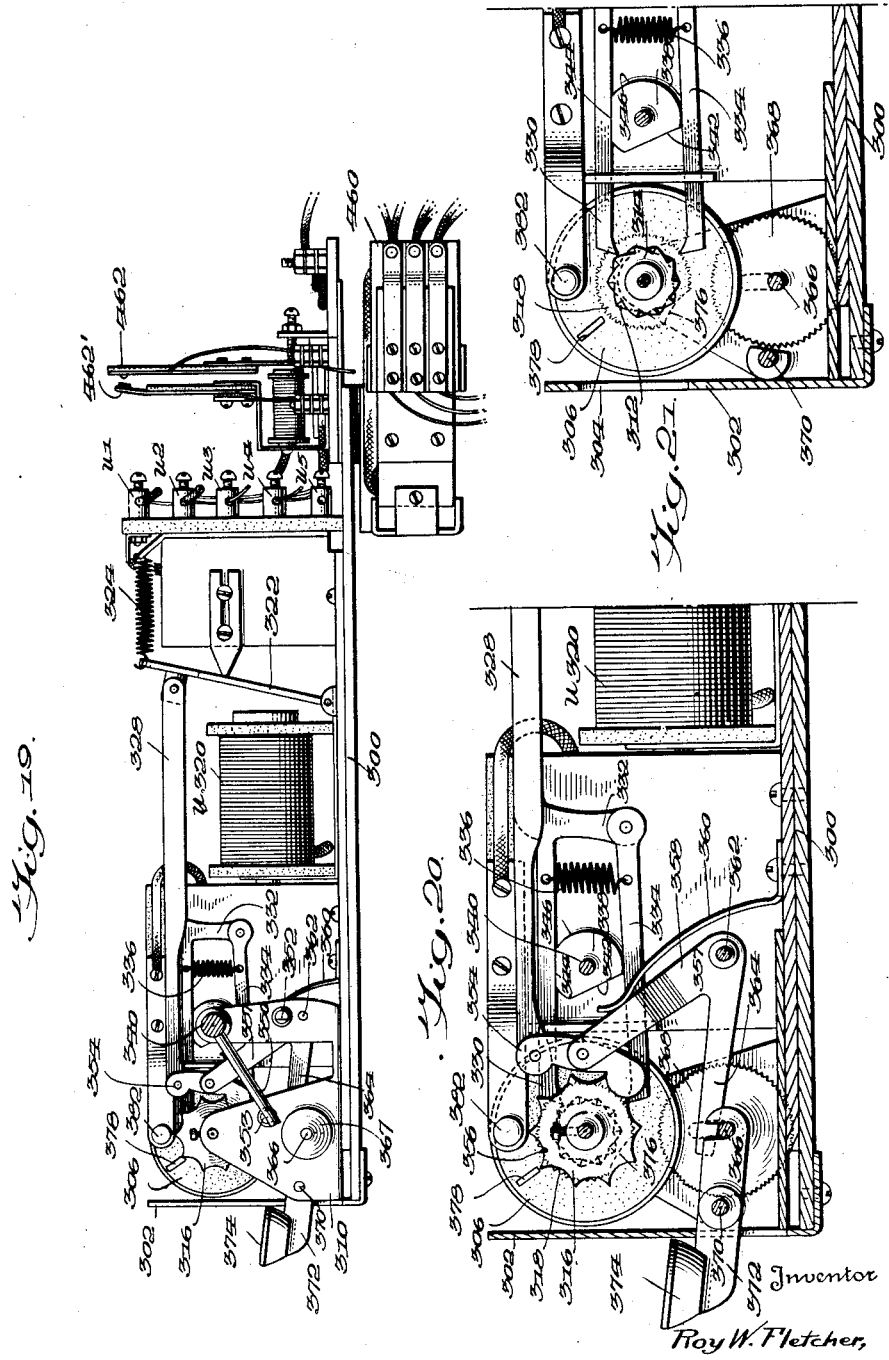

June 2, 1942.   R. W. FLETCHER   2,285,153
ADDING, SUBTRACTING, AND ACCOUNTING MACHINE
Filed July 11, 1936   13 Sheets-Sheet 10
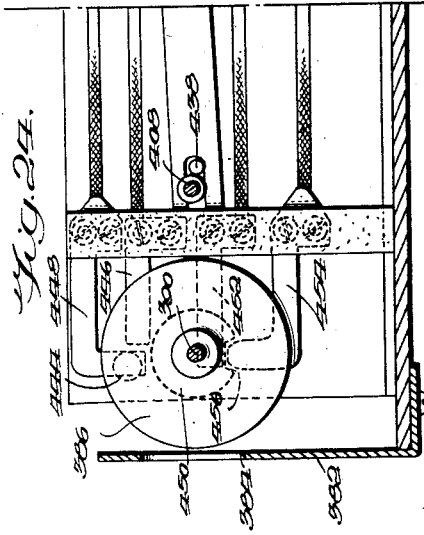
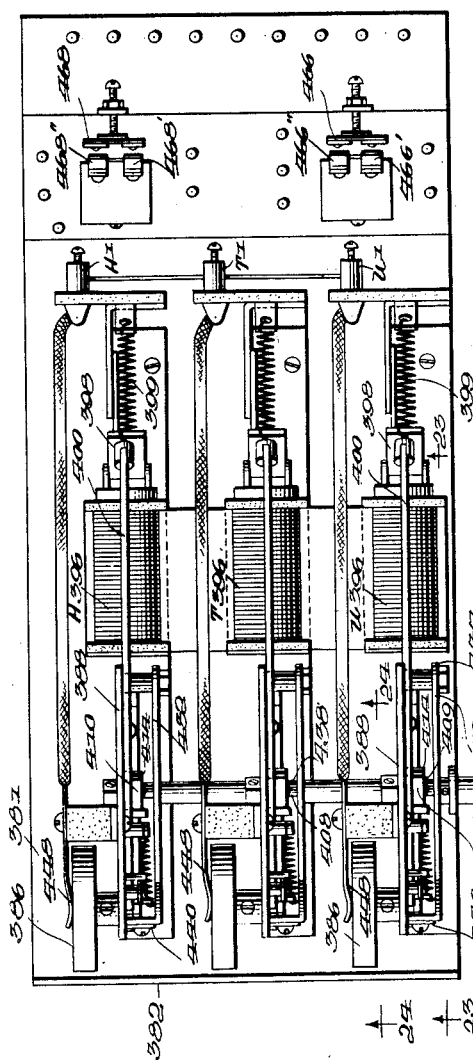
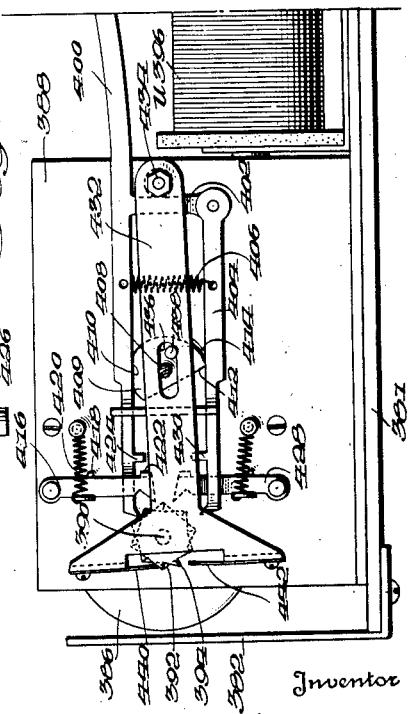
Inventor
Roy W. Fletcher;
By Vernon E. Hodges and
H. Hamlin Hodges
his Attorneys

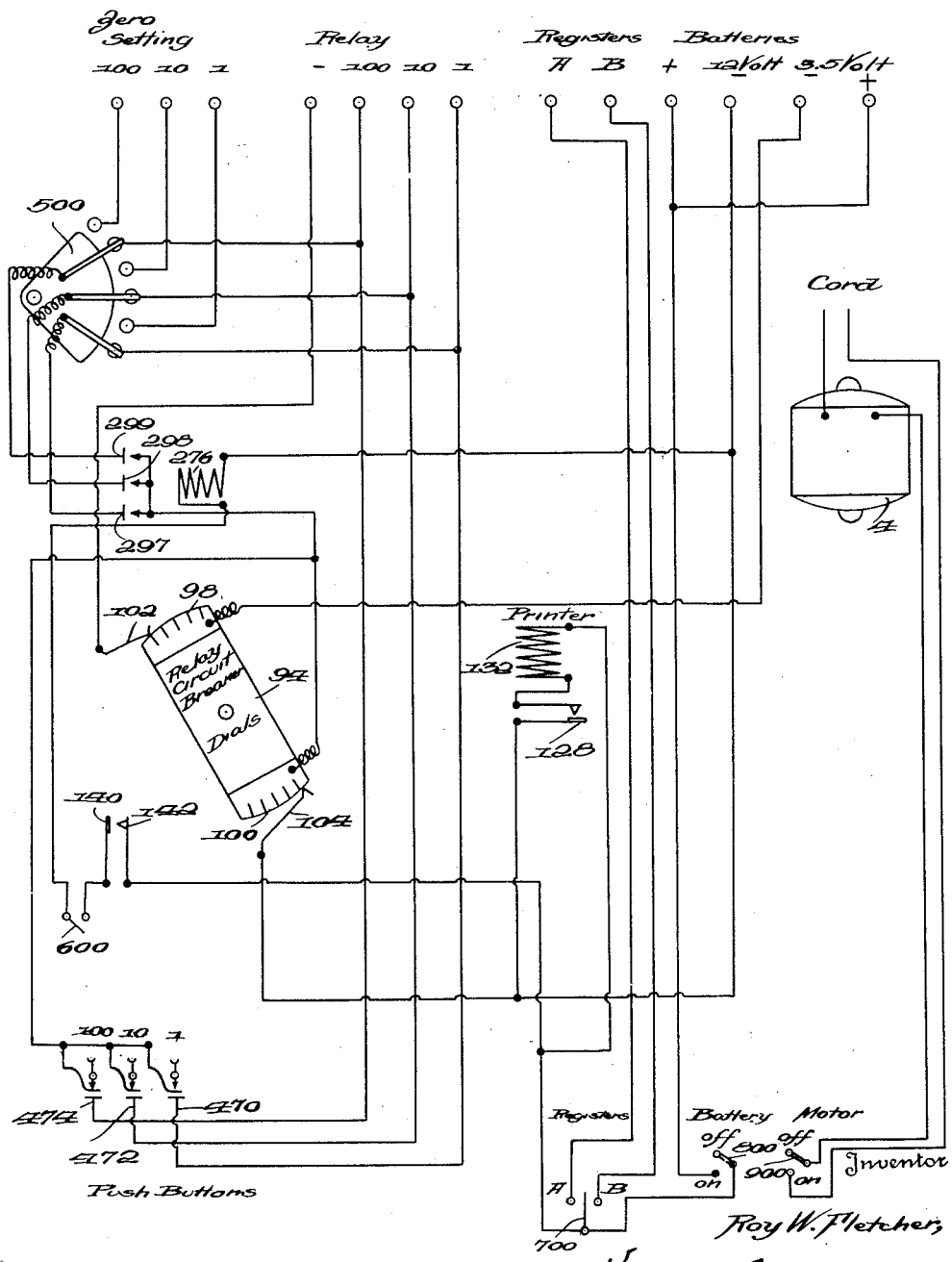

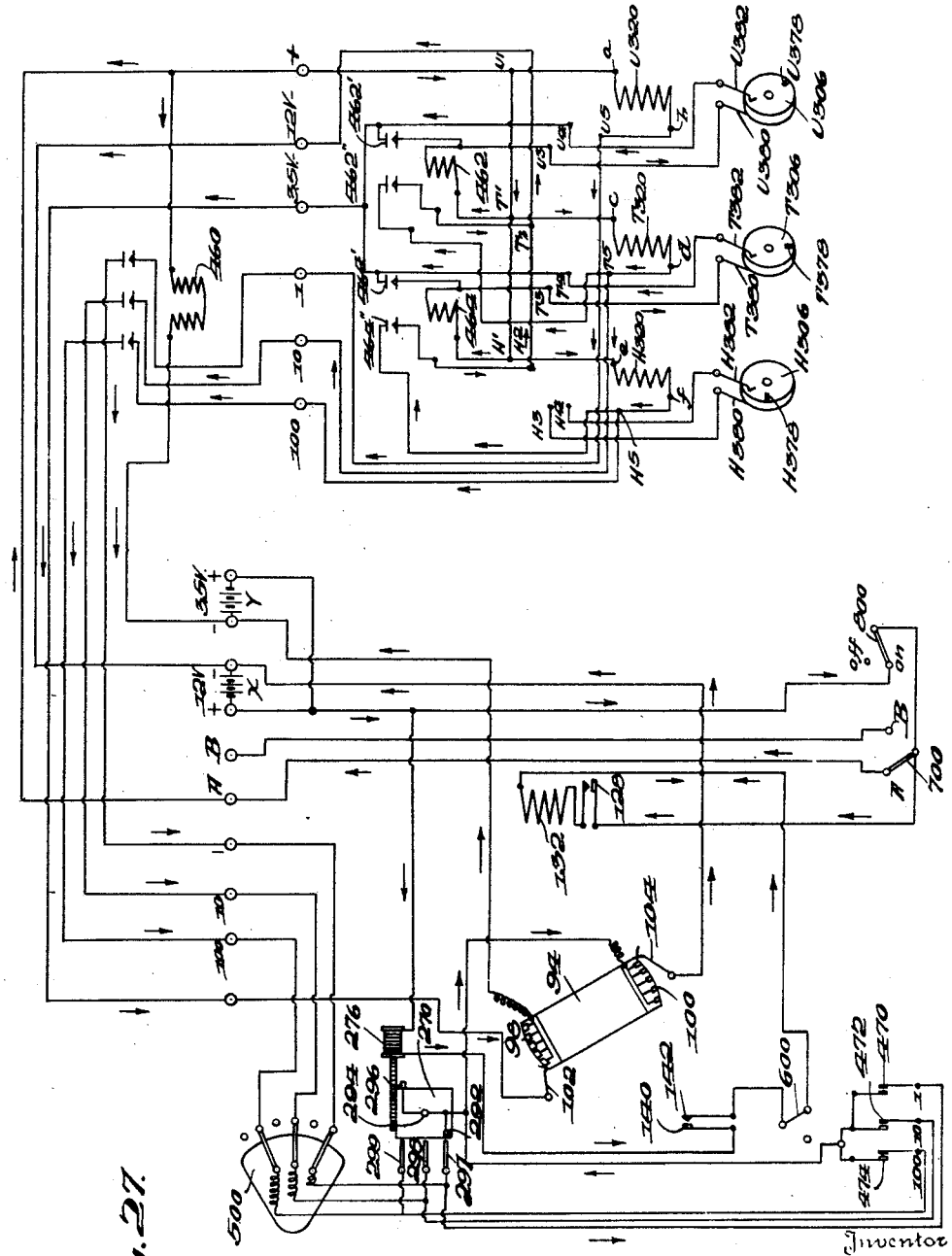

Patented June 2, 1942

2,285,153

UNITED STATES PATENT OFFICE 2,285,153

ADDING, SUBTRACTING, AND ACCOUNTING MACHINE

Roy W. Fletcher, Evanston, Ill.

Application July 11, 1936, Serial No. 90,214

5 Claims. (Cl. 177—380)

The primary object of my machine is to bring together into single sums under their proper designation all items belonging to each individual class or group, when the items for any such particular group or class appear at irregular intervals in a long list containing dissimilar entries, without the necessity of dealing consecutively with the items embraced in a particular group.

Another object of my invention is to provide a machine which is capable of cumulating progressively all amounts without differentiation as between classes or groups to which they belong, so that the amounts brought together separately according to group or class will be made into a common total, while the individual amounts making up such common total will simultaneously be brought together under their proper class or group designation and embraced in the total therefor.

A further object of my machine is to provide a master unit which may be connected with a plurality of recording units in such manner that one master unit may be utilized with any number of registering units. While there would be no physical limitation as to the number of registering units that could be connected to one master unit, an economic limitation might be imposed from the point of view of an enlarged investment and a less frequent use of registering units, on the one hand, and the added cost of an additional operator to operate the second master unit and its associated registering units, on the other hand. It is not impracticable to have one master unit associated with more than a thousand registering units.

In the accompanying drawings:

Fig. 1 is a plan view of the master unit;

Fig. 2 is a side elevation of the master unit (right side);

Fig. 2a is an enlarged fragmentary detail of the driving gear;

Fig. 3 is a rear elevation;

Fig. 4 is an irregular longitudinal vertical cross section on the line 4—4 of Fig. 1;

Fig. 5 is a longitudinal vertical cross section on the line 5—5 of Fig. 1;

Fig. 6 is a longitudinal vertical cross section on the line 6—6 of Fig. 1;

Fig. 7 is an irregular transverse vertical cross section on the line 7—7 of Fig. 1;

Fig. 8 is a fragmentary horizontal cross section of the printing tape carrier;

Fig. 9 is a longitudinal vertical cross section on the line 9—9 of Fig. 1;

Fig. 10 is an enlarged detail of a switch and a circuit maker and breaker in front elevation;

Fig. 11 is an enlarged detail of the switch and the circuit maker and breaker in side elevation (looking from the left side);

Fig. 12 is an enlarged detail of the triple contact switch in rear elevation;

Fig. 13 is an enlarged detail of the triple contact switch in side elevation (looking from the left side);

Fig. 14 is a transverse vertical cross section on the line 14—14 of Fig. 13;

Fig. 15 is a longitudinal vertical cross section on the line 15—15 of Fig. 12;

Fig. 16 is an enlarged perspective of the printing wheel guiding block, shown in Fig. 6;

Fig. 17 is a plan view of my preferred form of registering unit;

Fig. 18 is a front elevation of my preferred form of registering unit;

Fig. 19 is a longitudinal vertical cross section on the line 19—19 of Fig. 17;

Fig. 20 is an enlarged detailed longitudinal cross section on the line 20—20 of Fig. 17;

Fig. 21 is an enlarged detailed longitudinal vertical cross section on the line 21—21 of Fig. 17;

Fig. 22 is a plan view of another form of registering unit;

Fig. 23 is an enlarged detailed longitudinal vertical cross section on the line 23—23 of Fig. 22;

Fig. 24 is an enlarged detailed longitudinal vertical cross section on the line 24—24 of Fig. 22;

Fig. 25 is a diagrammatic wiring plan of the master unit;

Fig. 27 is a diagrammatic wiring plan of the master unit and the preferred form of registering unit.

*Master unit*

Figure 26:
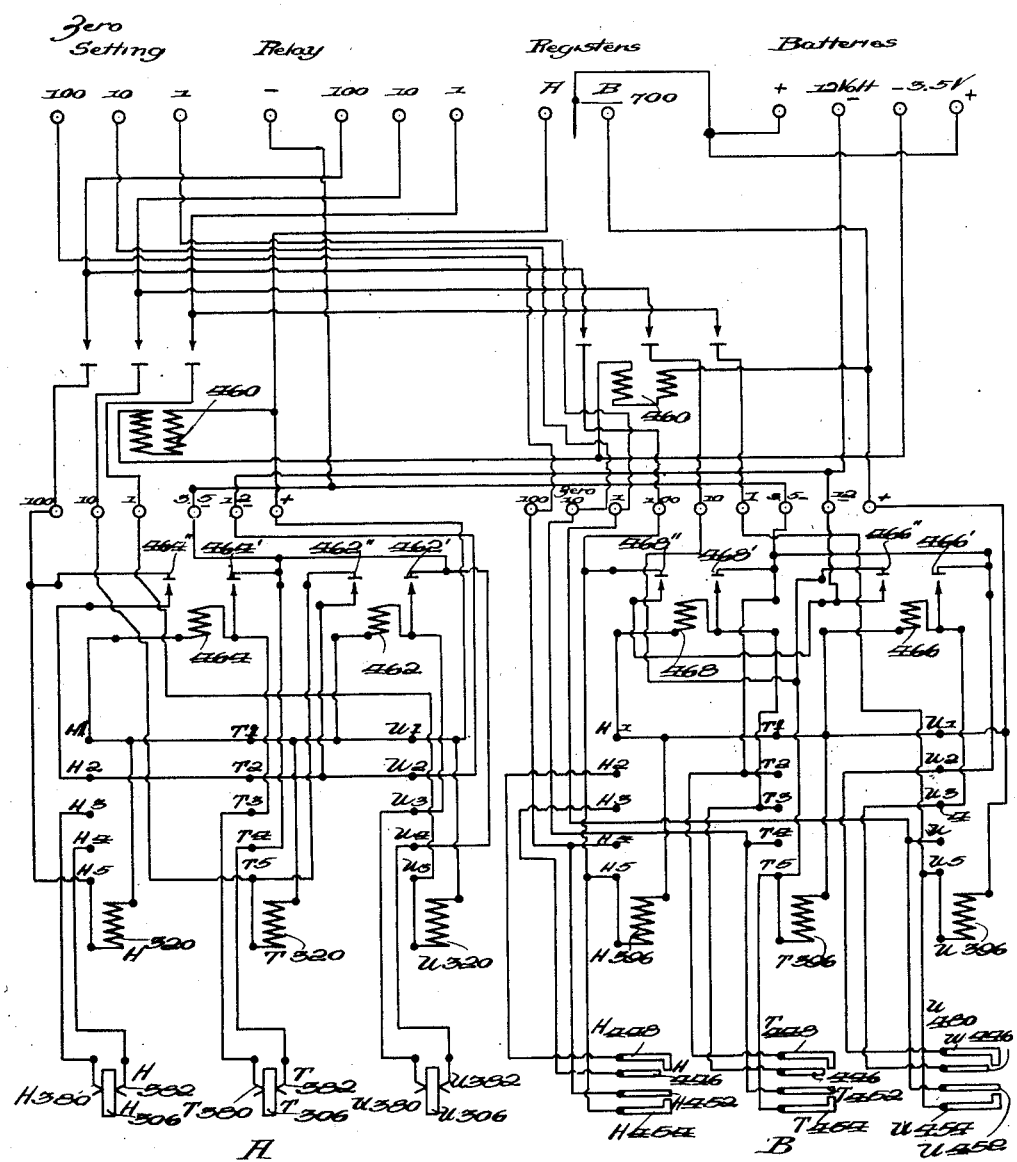
Fig. 26 is a diagrammatic wiring plan of both my preferred form and modified form of registering units.

The master unit is provided with a set of keys 2, bearing the numbers 1 to 9, inclusive, and zero. These keys are adapted to be depressed, one at a time, by an operator who is transposing figures, whether they are to be added, subtracted, or otherwise tabulated in an accounting operation.

The speed at which the keys 2 may be depressed by the operator and allowed to return to normal position is controlled by a chain of gears, rotated at a predetermined speed by the electric motor 4, preferably adapted for the use of either alternating or direct current.

The electric motor 4 is provided with a worm 6, which meshes in customary fashion with worm wheel 8, which worm wheel 8 is keyed or otherwise secured to a shaft 10 held in position by suitable bearings secured to the motor 4. A gear 12 is suitably secured to the shaft 10, in position to mesh with the small gear 14 mounted upon an independent shaft 16, secured in proper position on the housing for the chain of gears above referred to.

Secured to the shaft 16, I provide a special gear 17 having on the side thereof closest to the gear 14, a single tooth 18, which is adapted to engage with each revolution of the shaft 16, one tooth of the gear 20 and to turn the gear 20 in a clockwise direction (as viewed in Figs. 2 and 4). The portion of this gear 17 remote from the gear 14 is provided with an enlarged round surface 22, which is convex with the exception of the small notch 24, which notched portion 24 is in alignment with the tooth 18. As the motor 4 rotates and consequently rotates the shaft 16, the round portion 22 is allowed to revolve in the recesses 26 of the wheel 28, until the tooth 18 has again come into contact with the gear wheel 20, thus imparting a step-by-step motion to the gear wheel 20. It will be understood that the gear wheel 20 and the notched wheel 28 may be made integral or may be welded or otherwise secured together, so that they will rotate simultaneously in a step-by-step manner, as described above.

The notched wheel 28 and the gear wheel 20 are supported on a suitable shaft 32 to which is secured a gear 34, which meshes with a gear 36 to drive the ratchet gear 38 in a counter-clockwise direction. On the opposite side of the ratchet wheel 38 from the gear 36, I provide a gear 40 which meshes with a gear 42, the same size as the gear 40, and is secured to the shaft on which the ratchet wheel 44 is mounted. Thus the ratchet wheels 38 and 44, which are of the same diameter, will rotate in opposite directions at equal speed.

The keys 2 are all pivoted on a common shaft 46 and are each provided with a segment gear 48, which segment gear 48 is adapted to engage the elongated gear 50, which is mounted on a suitable shaft 52 (see Fig. 6).

Each of the keys 2 is provided with a projecting lug 54 which, when a key is depressed, is adapted to push upwardly on the transverse plate 56 which is pivotally secured by the elongated pivot pin 58 to suitable supporting framework. The transverse plate 56 is held in a downward position, as shown in Fig. 6, by a strong spring 60. An independent transverse plate 62 is also pivoted on the pivot pin 58 and is pressed upwardly into engagement with the set screw 64 by a spring 66, which spring is weaker than the spring 60.

As any numeral key 2 is depressed, the transverse plate 56 is raised by the projection 54, and the transverse plate 62 remains in a plane parallel to the transverse plate 56 until it is engaged against the pins 68 on the side wall supporting framework. When the transverse plate 62 is in position engaging the pins 68, the end of the transverse plate 62 remote from the pivot pin 58 will be in such a position as to engage any of the projecting lugs 54 of the keys 2, if an attempt is made to depress any other key. By this mechanism, I have provided a locking means which makes it impossible to depress a second key until after the first key, which has previously been depressed, has returned to its normal position.

Each of the keys 2 is provided with an upstanding lug 70, to which is fastened a spring 72 extending to a suitable cross bar 74 mounted on the supporting framework. Each of the lugs 70 is likewise provided with a set screw 76 which is adapted to come into contact with the fingers 78, adjustably secured to the cross shaft 80, and to rock the cross shaft 80 in a clockwise direction (as viewed in Fig. 6) when the numeral key 2 has reached a point close to the end of its downward stroke. Stops 82 are positioned on a suitable cross bar 84 so that the keys 2 may not be forced downwardly more than a proper distance.

The shaft 52 extends outwardly from both ends of the elongated gear 50, and on the right hand end thereof is secured an arm 86, which arm is positioned approximately upwardly. To the end of the arm 86, remote from the end which is secured to the shaft 52, a short transverse shaft 88 is secured, and on which shaft are pivoted pawls 90 and 92. The pawl 90 is adapted to engage the ratchet gear 38 and the pawl 92 engages the ratchet 44. These pawls 90 and 92 are held in engagement with the ratchets 38 and 44 by suitable springs 91 and 93 positioned between the pawls and the arm 86.

It will be seen that as the gear wheel 20 is rotated in a clockwise direction, the ratchet 38 will rotate in a counter-clockwise direction, while the ratchet 44 rotates at the same rate of speed as the ratchet 38 in a clockwise direction. Thus, when the motor is running, both the pawl 90 and 92 will normally ride over the teeth of the ratchets 38 and 44. When any one of the keys 2 is depressed, the elongated gear 50, and consequently the shaft 52 will be revolved in a clockwise direction (as viewed in Figs 2, 4, 5 and 6) and thus the pawls 90 and 92 will be moved to the right as viewed in Figs. 2 and 4) or toward the back of the machine. As a key 2 is depressed the pawl 92 will be in engagement with a tooth of the ratchet 44, and consequently the key cannot be depressed faster than a predetermined speed, this being necessary in view of the fact that the electro-magnets of the registering units, which will be more fully described hereinafter, are unable to operate under their load faster than a predetermined speed.

After a key 2 has been depressed and is released by the operator, it begins to return to its normal position, but the speed of the return is regulated by the engagement of the pawl 90 with one of the teeth of the ratchet 38 which, as described above, is rotating at a predetermined speed.

On the left hand end of the shaft 52, the end remote from the arm 86 and the pawls 90 and 92, I provide a suitable rocker 94, preferably made of insulating material (particularly illustrated in Figs. 9, 10 and 11). This rocker 94 is secured to the end of the shaft 52 and is provided with a coiled spring 96 which tends to return the rocker and the shaft 52 to their normal position (as shown in Figs. 9 and 11).

The rocker 94 is provided with arcuate edges on which are mounted suitable contact plates 98 and 100. These contact plates 98 and 100 are divided so that on the peripheral edge of the arcuate plates there are five distinct contact surfaces which will engage the fixed brushes 102 and 104, as the rocker 94 is rotated by the depression and the release of the keys 2. The contact points on the plate 98 are slightly larger than the points on the plate 100. These contacts 98 are made slightly larger than the contacts 100 so that the pulsations of 3.5 volt current transmitted through the contacts 98 and the brush 102 to the relay may be held slightly longer than the contact made by the contact plate 100 and the brush 104, through which 12 volt current is transmitted to the registering dials.

A segmental gear 106 is secured to the shaft 52, so that as the shaft 52 is rotated the segmental gear 106 will be swung through an arc. This segmental gear 106 is engaged with a small pinion gear 108 mounted on the shaft 110, to the other end of which a gear 111 is secured. A gear 112, supported by the short shaft 113 is positioned to be in mesh with the gear 111. This short shaft 113 not only supports the gear 112 but is also the pivot point for a substantially L-shape arm 114, which arm carries the gear wheels 115 and 116, and the printing wheel 118, which printing wheel is secured to and revolves with the gear 116. The L-shape arm 114 is provided with a covering 120 positioned over the printing wheel and the gear 116, the covering 120 being adapted to receive a blow from a solenoid operated hammer, which will be more fully described hereinafter.

The printing wheel 118 is provided with typing surfaces bearing the numbers 1 to 9, and zero. In alignment with each of the printing surfaces, I provide small transverse pins 122, which are adapted to become engaged in the V-shaped socket 124, when the covering 120 on the end of the L-shape arm 114 is struck by an electric hammer. Thus, the type set on the printing wheel 118 will be properly positioned to print on the printing tape, the operation of which will be described more fully hereinafter.

On the right-hand end of the shaft 80, I secure an arm 126 which extends from the shaft 80 toward the rear of the machine, the end of the arm 126 being positioned over a switch 128, the contact points of which are normally open. When any key 2 is depressed and reaches the bottom of its stroke, its set screw 76 comes into contact with its properly adjusted finger 78 and turns the shaft 80 slightly, which forces the end of the arm 126, over the switch 128, downwardly, making a contact between the points of the switch 128, and connecting an electric circuit with the wires 130 extending to a solenoid hammer 132, mounted over the printing wheel 118. When in a normal position the soft iron core 134 and the brass striker 135 of the solenoid hammer plunger are held in an upward position (as shown in Fig. 6) by a suitable spring 136, which is attached to the plunger and to a suitable upstanding inverted L-shaped arm 138. After a numeral key has been depressed, and consequently the printing wheel 118 has been turned so that the proper type is at the bottom thereof, when the key has reached the end of its downward stroke, the switch 128 is closed and the solenoid hammer 132 is energized, and thus the soft iron core 134 is drawn sharply downward and the brass striker 135 strikes the cover 120 of the L-shape arm 114, and a figure corresponding to the figure on the depressed key is printed on the printing tape. The plunger of the solenoid hammer 132 is immediately released and is pulled to its normal position by the spring 136 as soon as the numeral key is released and starts on its return to normal position.

As a key 2 is depressed, the shaft 52 will be rotated in a clockwise direction (as viewed in Fig. 9) and the rocker 94 will be turned and will raise the contact plate 100 and lower the contact plate 98. As the positions of these contact plates 98 and 100 are changed, the brushes 102 and 104 will make and break electrical circuits as they come into and go out of engagement with the five contact points of the contact elements 98 and 100. For example, if a numeral key 2 representing the figure "8" is depressed, on the downward motion of the key the shaft 52, and consequently the rocker 94, will be rotated so that the brushes 102 and 104 will pass four of the contact points and come to rest at the bottom of the downward stroke on an insulating section. Thus four contacts will have been made and broken on the downward stroke of the numeral key, and as the numeral key returns to normal position, the brushes 102 and 104 will again pass over four of the contact points and thus make and break electrical circuits another four times. The result will be that by the depression and release of a numeral key 2 representing the figure "8," eight electrical pulsations will have been made and will have gone to the proper registering unit of the machine, which will be described more fully hereinafter.

If a key 2 representing the figure "5" is depressed, the rotation of the shaft 52 and the rocker 94 will be the same as described above, but on the down stroke of the key only two contact points will pass the brushes 102 and 104, and the third contact point will be engaged with the brushes at the completion of the downward stroke, and three electric contacts will have been made. On the return stroke of the key, the brushes will pass only two contact points and thus only two electric contacts will be made, making a total of five.

To the left of the rocker 94, I provide a switch which completes a circuit each time any key 2 is depressed. This switch (completing the circuit to energize an electro-magnet for operating an independent switch which will be more fully described hereinafter) is operated at the very beginning of the down stroke of each key. The two electrodes 140 and 142 of the switch are positioned substantially vertically from the base plate on which the entire master unit is mounted.

While I illustrate these electrodes 140 and 142 slightly bent in the manner disclosed more particularly in Figs. 7 and 10, it will be obvious that the exact configuration of these electrodes may be modified and yet be capable of operating in the desired manner. An upstanding support 144, which support is adapted to position a pivoted lever 146, which is provided at the end thereof which comes into contact with the electrode 142, with an insulated portion 148, and with a depending arm 150, to the end of which is attached a suitable spring 152 for normally returning the lever 146 to the position shown in Figs. 7 and 10, and for holding the arm 150 against the stud 151, which position will allow the electrodes 140 and 142 to spring apart by their own inherent resiliency.

The rocker 94, at the end thereof on which the contact plate 100 is mounted, is provided on the upper edge thereof with a laterally extending arm 149 which is provided with a horizontally pivoted trigger 154. The trigger 154 is adapted to slide under the pivoted lever 146 when the rocker 94 assumes its normal or starting position (see Figs. 1, 9, 10 and 11). As the rocker 94 is swung through its arc by the depression of any of the keys 2, the arm 149 is raised by the rocker 94 and the trigger 154, being in its proper position under the lever 146, raises the lever 146 against the tension of the spring 152 and the insulated end 148 thereof will be forced downwardly and against the electrode 142, thus bringing the electrode 142 into momentary contact with the electrode 140 to complete the electric circuit to the electro-magnet referred to above. After this contact has been made, the trigger 154 slips past the lever 146 which immediately returns to its normal position (as shown in Fig. 10).

After a key 2 has been depressed and has returned to its normal position, the rocker 94 has also returned to its normal position. As the trigger 154 comes into contact with the lever 146 (which has already returned to its normal position), the trigger 154 pivots on its pivot pin 156 against the action of the comparatively weak spring 158, and again assumes its proper position under the lever 146 in readiness for a second operation.

Printing mechanism

The printing tape carriage is provided with two upstanding side walls 160, which are spaced apart at their front edges by a toothed bar 162, and at the rear edges thereof by a suitable spacing bar 164 which is provided with a ball bearing 165 to partially support and steady the printing carriage. The side walls 160 support a suitable platen 166 and feeding rollers 168 and 170 for feeding the printing tape 161 from the supply roll 163, which will be more fully described hereinafter.

A rack bar 172 is attached near the base of one side wall 160, and extending to the right of the machine to be engaged by the quadrant gear 174. This quadrant gear 174 is free on the shaft 176, which shaft extends from the quadrant gear 174, both forward and backward. A pin 177 secured to the shaft cooperates with a pin 179 on the segment to move the latter in one direction against the tension of a spring 175, which has one end secured to the pin 179, and the other to a fixed support, and which tends to move it in the other direction. On the forward end of the shaft 176, I secure a suitable spring retracted lever 178 which is provided at the end thereof with an outwardly extending handle 180. In operation, by depressing the handle 180, the lever 178 is forced downwardly and the shaft 176 is rotated in a clockwise direction (looking from the front of the machine) and thus the quadrant gear 174 is rocked and the rack bar 172 is forced to the left, thereby forcing the printing tape carriage to the left where it is held by one of the upper teeth in the toothed bar 162, which has come into engagement with a depending tooth 182 on the pivoted bar 184. Another pivoted bar 186 is positioned beneath the toothed bar 162 and is provided with one upstanding tooth 188 which is in position to engage a tooth of the lower set of teeth on the toothed bar 162. (It is to be understood that Fig. 7, which shows the tooth 188 in engagement with the toothed bar 162 and the tooth 182 out of engagement, is a figure which represents the printing tape carriage after it has been moved through three complete operations).

These pivoted bars 184 and 186 are suitably pivoted to the upstanding post 214 at the ends thereof in proximity to the quadrant gear 174 and are drawn together by a suitable spring 185 at the other ends thereof. The pivoted bars 184 and 186 are adapted to be forced apart by the pivoted cam 187, which will be more fully described hereinafter.

The mechanism for feeding the printing tape is shown particularly in Figs. 6 and 8. Under the printing tape carriage, I provide a pivoted arm 190 which is provided on one side with a cam lobe 192 in position to be engaged by the arm 194. The arm 194 is pivoted outside of the printing roller carriage by the pivot pin 196, and is provided with a small upstanding lug 198 which is adapted to be struck by the side wall 160 when the printing carriage is moved to its extreme left or starting position by the depression of the handle 180. As the upstanding lug 198 is struck and the arm 194 pivots on its pivot pin 196, the arm 194 comes into contact with the cam lobe 192 of the arm 190, and moves the arm 190 toward the rear of the machine, against the action of the spring 200, and forces the downwardly extending projection 202 of the pivoted pawl carriage 204, toward the rear of the machine.

The pawl carriage 204 carries the pawl 206 which is pivoted thereto and held in engagement by a suitable spring 207 with the ratchet 208, which ratchet is secured on the same shaft with the feed roller 170. I provide a locking pawl 210 which is held by a suitable spring 211 in engagement with the ratchet 208, to hold the ratchet 208 between operations of the pawl 206. The printing tape 161 is fed between the feed rollers 168 and 170, and thus as the roller 170 is rotated by the pawl 206, the tape 161 is pulled over the platen 166 to present a new surface to be printed upon.

A suitable inked-ribbon roller 212 is held in adjustable position on the upstanding post 214 by the thumb screw 216 and the spring 218 secured on the shaft 219. The ribbon from the roller 212 extends transversely across the platen 166, above the printing tape 161, and is engaged on the winding roller 220, to which is secured a ratchet 222 which is adapted to be actuated step-by-step by the pawl 224. The pawl 224 is held by a suitable spring 225 in engagement with a ratchet 222, and is pivoted to a suitable arm 226 pivotally mounted on the post 227 and is held in the position shown in Fig. 7, by a suitable spring 228. The arm 226 is adapted to be struck and moved to the right (as shown in Fig. 7), by the side wall 160 of the printing-tape carriage, when the carriage is moved to the left, as described above. (To the right as seen in Fig. 7.)

The printing tape carriage is moved step-by-step as the keys 2 are depressed, each key being provided with a cam lobe 230 near its point of pivot on the shaft 46. This cam 230 is in position to ride over and depress the shaft 232, which shaft is normally held in the position shown in Fig. 6, by the spring 234. The shaft 232 extends transversely of the machine and is pivotally secured in position by the link 236 on the right side of the machine pivoted at 237 and by the pivotally mounted arm 238 on the left side of the machine pivoted at 239.

The arm 238 extends toward the printing tape carriage and the end thereof is positioned beneath the arm 240 which is rigidly secured to a collar 242 mounted on a suitable pivot pin, and which collar is also rigidly secured to the cam 187. Thus the arm 240 and the cam 187 form, in effect, a bell crank. The arm 240 is normally held down in the position shown in Figs. 6, 7 and 8, by the spring 244, and is raised by the upward movement of the lever 238, each time a key is depressed. The raising of the lever 238 and the arm 240 thus changes the position of the cam 187 to force the pivoted bar 186 downwardly and consequently to release the tooth 188 from engagement with the toothed bar 162, and to allow the carriage to move until the depending tooth 182 on the pivoted bar 184 becomes engaged with a tooth on the upper side of the toothed bar 162, which bar 184 is pulled downwardly by the spring 185. This is effected just before the key 2 has reached the lowest point of depression and the contact is made by the switch 128 to make the electrical connection to energize the solenoid hammer 132. As the key 2 is released and is returned to its normal position, the lever 238, the arm 240, and the cam 187 will resume the position shown in Figs. 6, 7 and 8, and thus the tooth 188 of the pivoted bar 186 will again become engaged with a tooth on the lower side of the toothed bar 162, and at the same time the cam 187 will force the pivoted bar 184 upwardly to disengage the tooth 182 from a tooth on the upper edge of the toothed bar 162.

*Registering unit digit selecting switch*

On the rear end of the shaft 176, I provide a gear wheel 246, which gear is held free on the shaft 176 by a suitable collar 247, so that the gear 246 may rotate on the shaft 176 when the shaft does not rotate. The rack bar 248 is supported and held in engagement with the gear 246 by a suitable block 250 which is provided with lateral guides 252. On the side of the gear wheel 246 closest to the main mechanism, I provide a stud 254, which stud is adapted to be engaged by the lug 256 secured to the shaft 176. Thus when the handle 180 is depressed and the shaft 176 is rotated to force the printing tape carriage into its left or starting position, the lug 256 will engage the stud 254 and rotate the gear 246, which in turn will shift the rack bar 248 to the right (as viewed in Fig. 3).

The end of the rack bar 248 remote from the gear wheel 246, is supported by a suitable block 258, which block is provided with upstanding flanges to afford lateral support for the rack bar 248. At a point approximately above the block 258, a gear wheel 260 is properly meshed with the teeth on the rack bar 248. This gear wheel 260 is suitably secured to a short shaft 262, which shaft is properly supported by suitable uprights 263 and 264.

The ratchets 266 and 268, and a suitable drum of insulating material 270, are all secured to the shaft 262 and rotate therewith. The ratchet 266, and the gear wheel 260 are positioned on one side of the upright 264 and the ratchet 268 and the drum 270 are positioned on the opposite side thereof. As I have illustrated (more particularly in Figs. 13 and 15), I have made the ratchet 266 and the gear wheel 260 in one integral piece, but it will be understood that these two elements may be independent and adapted to be secured to the shaft 262 by any suitable means.

The pawl 272 is pivotally secured to the pivoted bar 274, which bar is properly positioned to be attracted by a magnet 276, which magnet is electrically connected with the electrodes 140 and 142, the action of which has been described above. The pawl 272 is held in engagement with the ratchet 268 by a spring 278, which spring is secured to a suitable arm 280 extending from the upright 264. The tension of the spring 278 not only holds the pawl 272 downward and in engagement with the ratchet 268, but also tends to return the bar 274 to its normal position out of engagement with the magnet 276, as soon as the electric connection with the magnet has been broken.

An independent pawl 282 is also pivotally secured to the bar 274 at the same pivot point as the pawl 272. This pawl 282 is adapted to engage the ratchet 266 after the magnet 276 has been energized and the pawl 272 has rotated the shaft 262 through a predetermined portion of a revolution. The engagement with the ratchet 266 is effected by the pawl 282 advancing and being held on an approximately horizontal plane by the track 284 which is suitably secured to the upright 264. On the end of the track 284 nearest to the magnet 276, I provide an arm 286 and a guide 288 to laterally support the pawl 282 and prevent it from sliding off of the track 284. A suitable spring 290 is secured to the pawl 282 and the arm 286, and tends to pull the pawl 282 downwardly, keeping it in proper contact with the track 284.

The drum 270 is provided with three lugs 292, 294, and 296, which are positioned so that they will engage the switches 297, 298, and 299, respectively, as the drum 270 is rotated step-by-step by the magnet 276, as described above. These switches 297, 298, and 299 are electrically connected, respectively, with the numeral discs in the registering units of the "units," "tens," and "hundreds" digits, all of which will be more fully described hereinafter. As shown in Figs. 12 and 14, the two electrodes of the switch 299 are in contact and thus the "hundreds" digit registering dial is in a completed circuit with the contact plates 98 and 100 and their fixed brushes 102 and 104. (The switch 299 is shown in a contacted position purely arbitrarily, as is the showing of the mechanism of the master unit in position for the third operation.)

It will be noted as shown in Figs. 12 and 13, that the teeth of the ratchets 266 and 268 face in opposite directions. In explanation of this arrangement, it is pointed out that the pawl 272 and the ratchet 268 are the means for rotating the drum 270, and that the pawl 282 and the ratchet 266 serve as stop mechanism against further motion of the drum in connection with each step-by-step operation; and that through the combination of the pawl and ratchet activities the lugs 292, 294, and 296 on the drum 270 are brought into, and held successively in proper alignment for the closing of, and holding, the contacts 297—297', 298—298', and 299—299'.

The operation of this switch is as follows:

When the handle 180 is pressed downwardly to place the mechanism in starting position, the gear wheel 246 is rotated, thus moving the rack bar 248, which in turn rotates the gear wheel 260, affixed to the shaft 262, and consequently the drum 270. When the mechanism is in its initial position, the lug 292 will be in a position so that when the electrodes 140 and 142 momentarily are connected, the electro-magnet 276 will be energized and the bar 274 pulled toward the magnet, thus advancing the pawls 272 and 282, which engage respectively the ratchets 268 and 266, and consequently turn the drum 270 a predetermined distance so that the lug 292 will press one electrode of the switch 297 to complete a circuit to the "units" digit numeral disc. The next time a key 2 is depressed, the electrodes 140 and 142 will again momentarily complete a circuit to energize the magnet 276, and thus the drum 270 will again be advanced a predetermined distance and the lug 292 will disengage the switch 297 while the lug 294 engages the switch 298 and completes a circuit to the "tens" digit numeral disc. The same operation as described above also takes place for the lug 296 which connects a circuit through the switch 299 as the lug 294 becomes disengaged from the switch 298, and thus through the switch 299, the "hundreds" digit numeral disc will be connected in an electric circuit.

It may be stated at this juncture that while I have illustrated and described mechanism for operating only on three digit numbers, it will be understood that numbers involving any number of digits may be provided for by merely elongating the drum 270, and providing the desired number of switches similar to the switches 297, 298, and 299. It will also be understood that when numbers containing more digits are to be handled, it will be necessary also to increase the length of the printing tape carriage, and its associated mechanism, the carriage illustrated and described being adapted for three digit numbers only.

Registering units

I have shown in Figs. 17 to 21, inclusive, my preferred form of registering unit, the mechanism thereof being mounted on a suitable base 300, which base is provided with a front or face plate 302, in which I provide a plurality of openings, or windows 304, through which the figures on the numeral dials 306 may be seen. It may be stated at this time that while I have shown only three numeral dials 306, and their associated operating mechanism, it will be understood that any number of these dials may be utilized, the number of dials being dependent upon the number of digits in the figures being added, subtracted, or otherwise tabulated.

Each of the dials 306 are independently supported on short shafts 308, which shafts are supported by uprights 310, suitably mounted on the base plate 300. I also secure ratchets 312 and 314 to the shafts 308. These ratchets 312 and 314 may be made either integral or individually, the teeth of the two ratchets facing in opposite directions. Both of the ratchets 312 and 314 are secured to the shaft 308 and consequently rotate with the shaft. I also secure a star wheel 316 to each of the shafts 308 and a knurled wheel 318, the purpose of both of which will be described hereinafter. It will be understood that as the shaft 308 revolves, the ratchets 312 and 314, the star wheel 316, the knurled wheel 318, and the dials 306 all revolve with it.

To rotate each of the shafts 308, I provide electromagnets U320, T320, and H320, which are provided with suitable pivoted bars 322, normally held out of engagement with the magnets by suitable springs 324. Near the end of the bars 322, remote from the pivot points thereof, I pivotally secure the pawl arms 326 and rocking arms 328. At the end of the pawl arms 326, remote from the pivot by which they are attached to the bars 322, I provide pawls 330, which engage the ratchets 312. On the arms 326, approximately midway between the pawls 330 and the point of pivotal connection with the bars 322, I provide downwardly extending arms 332, to which are pivotally secured pawls 334 which are drawn toward the pawls 330 by springs 336.

The pawls 330 and 334 are positioned to straddle cams 338 which are mounted on the shaft 340, which shaft extends through each of the several registering units so that as the shaft 340 is rotated, each of the cams 338 positioned between the pawls 330 and 334 of the independent registering units will be turned. The cams 338 are provided with two flat surfaces 342 and 344, between the ends of which is positioned a high lobe 346. The springs 336 keep the pawls 330 and 334 in contact with the cams 338 so that either the pawl 330 will be in engagement with the ratchet 312 or the pawl 334 will be in engagement with the ratchet 314.

As shown in Figs. 19, 20 and 21, the pawl 330 is resting on the flat surface 344, while the pawl 334 is engaged on a portion of the high lobe 346 of the cam 338, and consequently the pawl 330 is pulled by the spring 336 into engagement with the ratchet 312, and the pawl 334 is held out of engagement with the ratchet 314 by the lobe 346 of the cam 338.

To one end of the shaft 340, I secure a suitable knob or handle 348 which may be readily turned a limited distance, the distance being limited by the stud 350 which extends outwardly from the shaft 340, and is adapted to come into engagement with suitable lugs 352 and 353 which are positioned to stop the turning of the shaft 340 at a time when the flat surface 342 or 344 are in proper position to allow either the pawl 334 or the pawl 330 to be in position to engage either the ratchet 314 or 312, respectively.

When the pawl 330 is in position to engage the ratchet gear 312, any operation of the electro-magnet 320 will pull the pawl toward the face plate 302, and consequently will move the dial 306 one step, thus changing the number showing through the window 304 to one digit higher than the number previously shown through the window 304. If it is desired that the number showing through the window 304 be reduced one digit, the knob or handle 348 will be revolved in a counterclockwise direction (as viewed in Figs. 19, 20, or 21) and consequently the flat surface 342 on the cam 338 will permit the pawl 334 to come into engagement with the ratchet 314, the result of which will be that on the actuation of the electro-magnet 320, the pawl 334 will engage the ratchet 314, and turn the registering dial 306 in a clockwise direction (as viewed in Figs. 19 to 21) and consequently change the number showing through the window 304 to a number one lower than the number previously displayed.

To the rocking arm 328, at the end thereof remote from the pivoted bar 322, I provide a pivoted dog 354, which dog is provided with two substantially rounded ends for engagement with the concave surfaces 356 of the star wheel 316. The dog 354 is also pivoted to one arm 357 of a substantially V-shaped bell-crank 358, which is normally held in the position shown in Figs. 19 and 20, by the spring 360, and is pivoted at the apex thereof on the short shaft 362. The other arm 364 of the V-shaped bell-crank 358 is adapted to engage the shaft 366 and hold the shaft 366, and its attached knurled wheel 368, in the position shown in Figs. 20 and 21, and out of engagement with the knurled wheel 318. (It will be understood that a bell-crank 358 and its associated mechanism will be affixed in the above described manner to each registering unit).

On the shaft 370, which extends through all of the registering units, I provide at any convenient point a rocking arm 372, which is provided at the end thereof away from the registering unit with a suitable key 374, and is adapted to engage the shaft 366 at the other end thereof. Thus, by depressing the key 374 the shaft 366 will be raised and the knurled wheels 368 will be brought into registry with the knurled wheels 318 as the dogs 354 are removed from engagement with the concave surfaces 356 of the star wheels 316. The knurled wheels 318 are each provided with a concave portion 376, the curvature of which is equal to the curvature of its registering knurled wheel 368, and into which the knurled wheel 368 is forced after it has revolved its registering knurled wheel 318 until the concave surface 376 is brought into registry with the knurled wheel 368. Thus it will be seen that when it is desirable to turn the registering dial 306 back to a starting position or a "zero" setting, the key 374 may be depressed and the shaft 366 revolved by engaging and turning a suitable knob 367, secured to the end thereof, until the knurled wheels 368 come into registry with the concave portions 376 of the knurled wheels 318, at which time the shaft 366 will revolve freely and all of the registering dials 306 will be in such position that the figure "zero" appears through the windows 304. After this "zero" setting is obtained, pressure is released from the key 374 and by the tension of the spring 360, the mechanism is returned to the position shown in Figs. 19 and 20, and the registering dials are again in proper position for operation.

It will be understood that while I have shown only manual means for obtaining a "zero" setting of the above described registering unit, mechanical or electrical means may readily be provided. One simple means of obtaining such a result would be to properly position an electromagnet in relation to the rocking arm 372 so that at the desired time the rocking arm may be pivoted on the shaft 370 to raise the shaft 366 and place the knurled wheels 368 into engagement with the knurled wheels 318; and by attaching a suitable electric motor to the shaft 366 in place of the knob 367. With such an arrangement it would be obvious that by the use of the necessary conventional electric connections the electro-magnet may be energized to place the knurled wheels 318 and 368 in mesh. After this is done, a suitable electric motor may be started to revolve the shaft 366 until at least after the knurled wheels 368 have come into registry with the concave portions 376 of the knurled wheels 318, at which time a "zero" setting will have been obtained.

*"Carry over" mechanism*

Each registering dial 306 is provided with a contact point 378, which extends through the insulating material of which the dial 306 is made at a point approximately in registry with the number "2". Thus the contact point 378 will come into registry with the contacts 380 and 382 and make an electric circuit to energize a relay, which will be more fully described hereinafter, at the time that the dial 306 is changing from the number "9" to "zero," as viewed through the window 304.

In the modified form of registering unit shown in Figs. 22, 23, and 24, I have shown substantially different mechanism for operating dials similar to those shown in Figs. 17–22.

For this modified form of registering unit, I provide a suitable base 381 to which is secured a suitable face plate 382, which is provided with windows 384 through which the numbers on the register dials 386 may be seen. The register dials 386 are supported on suitable upright plates 388 upstanding from the base 381.

The short shafts 390 on which the dials 386 are secured, are provided with ratchets 392 and 394, the teeth of which face in opposite directions.

An electro-magnet 396 is suitably secured to the base 308 in alignment with the register dial 386. The electro-magnet 396 is provided with a conventional pivoted bar 398 properly positioned to be attracted by the electro-magnet, but normally held away therefrom by the spring 399. To the magnet bar 398 is pivotally secured an especially constructed pawl 400 which is provided with a depending arm 402, to which is pivoted a pawl 404. The pawls 400 and 404 are pulled together by the spring 406.

Extending through each of the registering units I provide a shaft 408, to which are secured cams 409, each of which is provided with flat surfaces 410 and 412, and a high lobe 414. As shown in Fig. 23, the pawl 400 rides on the flat surface 410, thus allowing the point of the pawl to be in position to engage the ratchet 392 on the actuation of the electro-magnet 396. While the pawl 400 is in the position shown in Fig. 23, the pawl 404 is engaged on the high lobe 414, and the point thereof is therefore kept out of contact with the ratchet 394.

A ratchet stop 416 is pivoted to the upright plate 388 and is normally held in the position shown in Fig. 23, abutting a stud 418, by the spring 420. The stop 416 is provided with a shoulder 422 at the end thereof remote from the pivot point, which shoulder 422 is adapted to be engaged by the lug 424 on the pawl 400 when the pawl is advanced by the actuation of the electro-magnet 396. The stop 416 is positioned so that when the pawl 400 is advanced, the stop will be advanced and brought into contact with a tooth of the ratchet 394 to stop the rotation of the shaft 390, and its associated mechanism.

The operation of the pawl 400, as described above, will, with each actuation of the electro-magnet 396, move the register dial one step, resulting in the next higher number on the dial 386 showing through the window 384.

When a subtracting, or number diminishing, actuation is desired, the shaft 408 is turned a part of a turn in a counter-clockwise direction, as viewed in Fig. 23, by turning a suitable handle 426 secured to one end of the shaft 408.

While I have shown only manual means whereby the operation of the registering unit may be changed from addition to subtraction, or vice versa, it may be readily understood that a simple electrical means could be provided for turning the shaft 408. One simple form of device that could be utilized would be electro-magnets which would draw the handle 426 from one position to the other. (Similar electrical means could also be applied to the shaft 340 in place of the knob or handle 348.) By thus turning the shaft 408, the affixed cams 409 will be turned so that the pawls 400 will engage the high lobes 414 while the flat surfaces 412 will come into alignment with the pawls 404. With the pawls 400 and 404 in this position, the pawl 400 will not engage the ratchet 392 and the pawl 404 will engage the ratchet 394.

A ratchet stop 428, similar in every respect to the ratchet stop 416 is pivoted to the upright plate 388 in position to be engaged by a lug 430 on the pawl 404 with each actuation of the electro-magnet 396. When this ratchet stop is actuated it comes into engagement with the ratchet 392 to stop the further rotation of the shaft 390.

To maintain the dial 386 in a fixed position at a time that the pawls 400 and 404 are not in operation, I provide a substantially T-shaped arm 432 which is pivoted to the upright plate 388 by a suitable pivot pin 434. At approximately the center of this arm I provide an elongated slot 436 through which the shaft 408 passes. On the cam 409 I provide a stud 438 which extends into the slot 436 in position to raise or lower the T-shaped arm 432 as the shaft 408 is rotated.

The end of the T-shaped arm 432 remote from the pivot pin 434 is provided with spring clips 440 and 442 which engage, respectively, the ratchets 392 and 394. It will be obvious that when the pawl 400 is in engagement with the ratchet 392, the spring clip 440 will also be in engagement with the ratchet 392, and the spring clip 442 will be out of engagement with the ratchet 394.

In Fig. 24, I have shown a more detailed drawing of the register dial 386 showing the position of contact members on the left side thereof (as viewed in Fig. 22).

The register dial 386 is provided with a metallic contact point 444, which is positioned on the dial so that it will be in the position shown in Fig. 24, (at the time that a "zero" is displayed through the window 384). This contact point 444 is of sufficient size so that it will bridge the gap between the contact brushes 446 and 448 and thereby make an electrical connection between the brushes 446 and 448 to actuate an electric relay for transferring an impulse to a register dial of one higher digit, which will be more fully described hereinafter.

*Special individual dial selecting switches*

In Fig. 27, I have shown in the lower left hand corner three push button contact switches 470, 472 and 474, which are representative of a plurality of push buttons which are to be used in connection with both the preferred and the modified registering units in the correction of known errors, as hereinafter described.

In the illustration made of the push button switches, only three digits have been provided for, namely "units," "tens" and "hundreds," but it will be understood that there must be provided as many push buttons similar to 470, 472 and 474 as there will be dial positions in the registering units.

*Use of the special dial selecting switches for correction of errors*

These push button switches may be utilized at a time that a known error is to be corrected in connection with the use of both the preferred and the modified registering units. In this case the push button representing the digit wherein the error is to be corrected is depressed and a key 2 representing the amount of the known error is utilized so that the correct number of digits may be either added or subtracted to make the necessary correction.

*Electric relays that isolate and complete the chain of circuits between the master unit and a particular registering unit*

In both the preferred form of registering unit and the modified form, I utilize an electric relay 460, which relay is energized by the closing of the switch for selecting the registering unit to be utilized for a particular operation. The purpose of this relay 460 is to connect the master unit directly with the registering unit without the necessity of a complex wiring plan which would provide individual electric connections between the master unit and each of the dials of the several registering units. After the relay 460 has been energized the necessary connections are made whereby the pulsations from the master units are properly directed to the particular registering unit on which the relay 460 is mounted.

While I have shown the relay 460 as having only three contact points, it will be understood that this relay utilizes only three contact points because the registering units which I have shown and described disclose only mechanism for handling a three digit number.

It will be understood that when one particular register has been selected and the relay 460 on that register has been energized, the relays on all of the other register units will not be energized and therefore will not be connected with the master unit.

*Functions of the "carry over" mechanism*

In Fig. 17, I have shown two relays 462 and 464, the relay 462 being electrically connected between the "units" digit register dial and the "tens" digit register dial, while the relay 464 is electrically connected between the "tens" digit registering dial and the "hundreds" digit registering dial. The relays 462 and 464 are identical in construction and are provided with two electrodes each. These electrodes are identified as 462' and 464', both of which connect a 3.5 volt circuit, and 462" and 464", both of which electrodes connect a 12 volt circuit. It will be understood that one of these relays will be interposed between each adjacent pair of register dials.

In the case of the preferred form of registering unit (shown in Figs. 17 to 21), the relay 462 is energized at the time that the contact point 378 comes into registry with the contacts 380 and 382 of the "units" register dial, and an electrical pulsation is transferred to the electromagnet 320 of the "tens" digit register dial. In other words, as the number showing through the window 384 of the "units" register changes from a "9" to a "zero," one actuation is made in the "tens" digit register. It will be obvious that the same operation will take place as the "tens" digit register changes from a "9" to a "zero," at which time one actuation o fthe electro-magnet for the "hundreds" digit register is afforded.

*Electrical operations—general*

In the description above, I have been more particularly describing the mechanical elements which function in conjunction with electric wiring circuits to connect circuits for the proper transmission of electric energy for the operation of the dials of the registering units. In Fig. 27, I have shown a shiftable switch 500, which has three contact arms positioned as indicated to properly connect the switches 297, 298, and 299, with circuits leading to "units," "tens," and "hundreds" digit recording dials in the selected registering unit. This switch 500 may be shifted, so that the three contact members will connect these three switches 297, 298, and 299, with the "units," "tens," or "hundreds" digit recording dials for purposes of "zero setting," as will be described more fully hereinafter. The normal position in which the switch 500 is placed is the position in which it is shown in Fig. 27.

For the purpose of correcting known errors, I utilize also the individual dial selective switches 470, 472 and 474, which serve to single out a particular dial in the particular registering unit in which the known error is to be corrected. When these three selective switches 470, 472, and 474, are used, the switch 500 is left in the position in which it is shown in Fig. 27, it being at this time inoperative. These selective switches connect the proper registering dials directly with the make and break contacts 100 and 104. Since the selective switches 297, 298, and 299 are not to be used at this time, the electromagnet 276 is cut out of the circuit by opening the switch 600.

It will be understood that the rocker 94 with its contact plates 98 and 100 and the fixed brushes 102 and 104 will be utilized during a "zero setting" operation the same as they are utilized with the normal adding or subtracting operation.

It may be well at this point to add to the description of the contact plates 98 and 100, by stating that the contact surfaces of these plates are not exactly similar in construction. The contact surfaces 98 are slightly larger than the surfaces 100, the purpose of this being to hold the contact between the surface 98 and the fixed brush 102 for a slightly longer period of time than the contact between the surfaces 100 and the fixed brush 104. The contact plate 98 and the brush 102 transmit a three and one-half volt current which is sufficient to continue to hold the magnets of the relays 462 and 464 following the initial energizing thereof, upon the contact point 378 being interposed between the contacts 380 and 382.

This additional holding of contact is necessary because the time at which the contact points 378 pass the face of the electrodes 380 and 382 is of such brief duration that it may not be a sufficient length of time for the pawl 326 to make a full stroke and thus to effect a rotation of the registering disc 306 in the "tens" digit position one step to provide the "carry over" when the registering disc 306 in the "units" digit position changes from "zero" to "9," or "9" to "zero." To overcome this possible lack of sufficient time for the electrical contact, the relays 462, and, are held in contact for a sufficiently longer period to permit a proper functioning of the "carry over" mechanism. The result will be that at the moment the contact 380 and 382 is made, the relays 462 or 464 will be energized and individual circuits will be closed, bringing the same source of power into the magnets of the relays 462 and 464, and continuing their energization after the contacts 380 and 382 have separated, and until the source of power has become definitely interrupted as a result of the breaking of the contact between the contact points 98 and the brush 102.

By using the preferred form of register (sometimes designated as register "A"), as shown in Figs. 17 to 21, inclusive, as an example, the contact between the contact points 380 and 382 in the "units" digit registering disc effects the first energizing of the magnet of the relay 462. This relay 462 is provided with two separate points, the contact point 462' being connected with a three and a half volt circuit, while the contact point 462'' is connected with a twelve volt current, which latter current flows to the magnet T320 of the "tens" digit recording disc.

Electrical circuits

In the wiring diagram which I have shown in Fig. 27, I have indicated diagrammatically the electrical circuits which are necessary for the connection between the master unit and the preferred form of registering unit (sometimes identified as A).

In Fig. 27, I have shown a conventional form of switch 700 which is to be utilized in properly connecting a battery circuit with the preferred form of registering unit (registering unit A) or with the modified form of registering unit (registering unit B) which will be described hereinafter, by merely shifting the switch 700 into contact with either the contact point A or B. While I have shown a switch that may only make a connection with either of two separate registering units, it will be understood that, when put into commercial use, my master unit may be connected with a great many registering units. When such is the case, instead of having a two-way switch, such as the switch 700, I shall provide a bank of switches, or push buttons, one for each of the several registering units. With such a construction, the operator of the master unit may select any one of a number of registering units at a time that the machine is in use.

The conventional switch 800 is merely a switch whereby the current from batteries may be turned either "on" or "off" at the time that the mechanism is to be in operation or idle. A similar switch 900 is provided for the electric motor 4, which, as described above, places the master unit in condition for operation at the time that the switch 900 is turned to an "on" position.

The intricacies of the details of these wiring diagrams make it necessary to elaborate considerably on the inter-relations of the relays, magnets, and switches and the use of the electrical circuits which are in common in some respects. One aspect in which these circuits are sometimes confusing is due to the inter-relation of the circuits and the contacting of power of different voltage to points where the different voltages are used, and the employment of common and independent binding posts, cross wiring, magnets, switches, circuit makers and breakers, and other electrical devices used to obtain the desired results.

Attention is directed to the fact that, as disclosed in Fig. 27, a high and low voltage is in use. These are direct currents suitable for energizing small magnets, properly wound. The higher-voltage, 12 volt, current is transmitted to the magnets 320, that actuate the pawls 330 and 334, for the rotation of the discs 306, contacting as shown in Fig. 21. The 12 volt current is also used in energizing the solenoid 132 for operation of the hammer thereof, and to energize the magnet 276 cooperating with the revolving drum 270 of the contact enforcing switch, arranged as shown in Figs. 12, 13 and 14. The energizing of magnet 276 is effected through the contacting of the electrodes 140 and 142, which are brought together momentarily by the action of the pivoted lever 146, which is forced downward by the upward movement of the trigger 154, secured laterally to the rocker 94. It will be noted that the use of the 12 volt current for the step-by-step advancement of the revolving contact enforcing drum 270, is in advance of the use of that same 12 volt source of power to effect rotation of the registering discs 306, in the registering unit, coincident with each engagement of the resilient contact brush 104 with the contact plate 100.

The low-voltage current, 3.5 volt, is used for the energizing of magnets in the relays 462 and 464, as well as the magnets for the relay 460, which effectuates the bringing together simultaneously of the corresponding independent ends of the circuits leading to the corresponding ends of wound wires of magnets used to rotate the discs 306 by actuating of pawls 330 and 334, shown in Fig. 21.

In connection with the functioning of the relays 462 and 464, attention is directed to Fig. 21. While the physical details may be somewhat different, the actions and purposes are similar, therefore, an explanation regarding Fig. 21, will suffice for both Figs. 21 and 23.

Attention is directed to the resilient contacts 380 and 382, which are the same on the "units," the "tens" and the "hundreds" registering discs. The lobes of these contacts ride with some pressure against the lateral faces of the insulation forming the lateral surfaces of each disc 306. The metal insert 378 has its ends flush with the lateral faces of the insulated discs 306. The metal insert 378 must at least once in a complete revolution of a disc establish at this point a closed circuit at the moment it passes between the contact lobes 380 and 382. The instant of this contact is the moment the figure appearing in window 304, is changing from "9" to "0," or from "0" to "9," depending on the direction of rotation of the disc 306, in an addition or subtraction process. When this contact channel is thus closed in the disc 306, in the "units" digit position, taken as typical, there is a flow of 3.5 volt current to the magnets of the relay 462, positioned to the rear of the disc 306, serving in the "tens" digit position. Immediately upon the energizing of these magnets the two electrodes 462' and 462'', of the relay 462, are closed and two circuits are made, the one in which the electrodes 462'' is a part is for the passage of the 12 volt current through the magnet 320 which actuates the pawls 330 and 334, for rotating the disc 306 in the next advanced digit position, and the electrode 462' is for continuing the energizing of the magnets of the relay 462 with current from the 3.5 volt battery.

Preliminary to describing the course of the electric currents incidental to the functionings of the several parts of the machine, attention is directed to Figs. 27, wherein certain identification numbers have been shown, as follows:

Binding posts mounted on an insulated upright (Figs. 17 and 22) have been designated U1, U2, U3, U4, and U5; T1, T2, T3, T4, and T5; and H1, H2, H3, H4 and H5, in the "units," "tens" and "hundreds" digit positions, respectively, of the "A" registering units, as positioned from the top down towards the base plate 300, in unit "A."

The major magnets in registering unit "A" have been designated U320, T320 and H320, from right to left.

The "carry over" contacts in unit "A" have been identified as U380 and U382, T380 and T382, and H380 and H382.

Making a connection with a particular recording unit, like "A," results in the magnet of relay 460 (Fig. 19) being energized, thereby effecting a closing of all corresponding circuits leading to similarly positioned binding posts, as will be hereinafter described. It is particularly pointed out that the completion of the contact in the switch represented as 700 with unit "A" (or "B") (Fig. 27) automatically makes the electrical impulses induced by the action of a key 2, flow directly to the selected unit, and to the magnet therein associated with the "units," "tens" or "hundreds" digit disc, accordingly as the revolving contact-enforcing drum 270 in closing switches 297, 298, and 299 (Figs. 12, 13 and 14) causes the electric current to be directed through the circuits connected with the electrodes of those switches, progressively, as they are closed and allowed to reopen as action proceeds from the "units" digit position to the left.

*Functioning of discs in registering units*

The following is a statement of the actions that take place in the registering of two given amounts, say "369" and "431": The motor 4, is started by closing the switch 900, and consequently the rotation of the gears 38 and 44, which permits a stroke of a key 2, and controls the speed at which the operator may depress a key, and the speed at which the spring 96, may return the key to its normal position. The next act of the operator is to shift the printer-roll carriage to its extreme left position by thrusting the handle 180, down to its lowest position.

The amounts "369" and "431" are assumed to be of like denomination, that is, they are both to be recorded on one registering unit, for example the unit "A". The operator, therefore, throws the switch 700 to connect the registering unit "A", which relationship will be held and continued until the operator wishes to disengage it, in order to register an amount upon some other registering unit, say "B". The making of the contact with "B" would disconnect unit "A" completely from the master unit until a connection therewith was again restored.

Since we are concerned with entering the amounts "369" and "431" from the original sources and producing a total for the two amounts, we will follow the registering of these amounts upon the discs of unit "A".

Coincident with the closing of the switch bringing register "A" into circuit with the master unit, the relay 460, functions in the closing of a gap existing between certain circuits leading from the "units", "tens" and "hundreds" digit switches 297, 289, and 299 (Fig. 13), to the binding posts U1, T1 and H1, in registering unit "A", respectively, and through such binding posts to corresponding ends of the wires wound upon the cores of magnets U320, T320 and H320, which actuate pawls for rotating discs in the "units", "tens" and "hundreds" digit positions, respectively.

At this stage of the operation, there are two places in the electrical circuit where a "break" exists. There is no contact as yet at either switch 297, 298, or 299, or at the contact 100 and the brush 104 (the only contact being in the relay 460).

For convenience in describing the course of the electric current, I shall speak of the 12 and 3.5 volt current as flowing outward from the positive poles to the negative poles. It will be noted that in some respects there is a community of use of a circuit from the positive poles of the different sources of power designated 12 volt and 3.5 volt. However, there is no merging or aggregating of these unequal currents jointly using certain circuits, which do not necessarily flow simultaneously, although that would neither be an impossibility nor a hindrance.

The amount to be transcribed first is "369." Proceeding from right to left, the key 2, showing figures "9", "6", and "3", respectively, would be depressed until the end of the stroke is reached, when the key would be allowed to return, each action being completed before the next is undertaken.

These things happen during the downward and return stroke of each of the three numeral keys 2 bearing numbers "9", "6" and "3." The velocity of the downward and return stroke would be at the same rate for an equal distance in each direction. The velocity would be definitely regulated by the engagement of the pawl 90, with gear 38, on the downward stroke, and the engagement of the pawl 92, with gear 44, on the return stroke. Simultaneously with the commencement of the downward stroke of each of the three numeral keys, 2, the locking plate 62, would move into position to prohibit the depression of more than the key selected. Almost instantly with the commencement of the downward stroke of each of the keys, 2, for the numbers, "9", "6" and "3", the contacts 140 and 142 would be momentarily brought together, resulting in the flow of the 12 volt current to magnet 276, thereby energizing that magnet and rotating the drum 270 one step. This first step would result in the closing of the contact points of the switch 297, thereby closing one of the gaps still remaining in the circuit from the 12 volt battery to the magnet U320 (Fig. 27). As the stroke of the key, 2, representing the numeral "9" is continued, but not before the contact was made at the switch 297, the contact at 104 and 100 would commence and be made and broken four times, and at the end of the down stroke an additional contact would be made and held until broken shortly after commencement of the return stroke, during which return stroke four additional interruptions would take place. The result of these nine interruptions would be the changing of the numeral appearing in the window 304 from a "0", to a "9."

Simultaneously with the continued depression of the numeral key, 2, for the number "9", action would be imparted to the segment gear 106, and thereby to the gear wheels motivating the printer-wheel 118, so that at the moment when the key 2, for the number "9" had reached the limit of its downward stroke, the figure "9" on the printer-wheel 118, would be nearest to the paper tape and over the vertical center line of the platen. At that moment, the contact would be closed at the switch 128, resulting in a flow of 12 volt current to the solenoid hammer 132, causing it to be drawn down, thus striking of a sharp blow on the cover 120 (Fig. 6). This blow results in the printer wheel bringing the inked ribbon into contact with the printing tape 161 riding the platen 166, and imprinting a figure "9" on the tape 161, immediately under the V shaped socket 124.

Coincident with the depressing successively of the two other keys 2, for the numbers "6" and "3", there will be a momentary closing of the contacts 140 and 142, and a stepping forward of the devolving drum 270, producing a closing and a release of the contact switches 298, and 299, successively. These actions will route the current to the "tens" digit position magnet (T320) for six electric pulsations, and then to the "hundreds" digit position magnet H320, for three pulsations, as the keys 2, for the numbers "6" and "3" are successively depressed and released.

In Fig. 27, it will be noted that the positive poles of the 12 and 3.5 volt batteries X and Y, respectively, are joined in a common circuit leading to switch 700 and thence to register "A". Starting with the depression and release of the key for the number "9", the mechanical results of which have been described above the current will flow as follows:

For convenience, it will be considered that current flows from the positive pole through a circuit to the negative pole of a battery. Several arrows have been placed on the wiring diagrams to show the direction of current flow. From the positive pole of the 12 volt battery X current will pass through the switch 800, the switch 700 (which is positioned to contact the preferred form of registering unit, the unit A) and will flow upwardly through the contact point marked "A" and subsequently over to the right of the diagram to a contact point marked "+". From this contact point, current flows to the binding post U1 and to the connection $a$ connected with the magnet U320. A suitable wire connects the binding-post U1 with binding-posts T1 and H1. From the other end of the coil of the magnet U320, a suitable wire extends from a connection $b$ to a binding-post U5. From this binding-post U5, a wire extends to a suitable connection marked 1, and is consequently connected with the relay 460. From the relay 460 a wire is connected to the "units" switch arm of the switch 500 which is connected with the contact point 297, which is operated by the digit selecting switch operated by the drum 270. From the contact switch 297 a wire extends to the contact plate 100, which is contacted as described above by the contact brush 104 from whence a wire extends to the negative pole of the battery X. This circuit permits current to flow as described above through the magnet U320 and to afford any selected number of pulsations thereof for turning the registering disk 306 the selected number of steps.

The course of the circuits (Fig. 27) in connection with the functioning of the keys 2 bearing the numerals "6" and "3" would be the same except that circuits to magnetize T320 and H320 would be used. In view of the fact that the digit selecting switch drum 270 will have been turned to contact the selecting switch 298, consequently to connect the "tens" digit registering unit, the current would pass directly through the binding-post U1 and pass to the binding-post T1. From the binding-post T1 current will flow to the connection $c$ of the magnet T320. After passing through the coil of the magnet T320, current will pass to the binding-post T5, which is connected to the magnet T320 by a suitable wire passing therefrom to a connection $d$ with the magnet. From the binding-post T5, a connection is made to the digit selecting switch (298) in the same manner as the binding-post U5, and consequently current will flow therethrough through contact plate 100 to the brush 104, and subsequently be returned to the negative pole of the battery X.

In the case of the registration in connection with the key 2 for the number "3", current would flow in the same manner from the positive pole of the battery X and would pass through both the binding-posts U1 and T1 to the binding-post H1, from whence it will pass through the connection $e$ and the magnet H320 and the connection $f$ to the binding-post H5. From the binding-post H5, connections are made through the relay 460, the switch 500, and the digit selecting switch 299 with the contact plate 100, the brush 104, and subsequently the negative pole of the battery X.

At this stage of the registration, the printer-roll carriage 160, would have returned in three successive steps to its last position, and before undertaking the registration of the next amount "431", the printer-roll carriage 160, would be returned to the left, to its starting position, by depressing the handle 180. This return action would also set the drum 270 back to its starting position, as well as to laterally shift the inked ribbon, and to present a new surface of the printing tape 161, on which the next number to be registered will be printed.

This printer tape will provide a record in the order of registration of all the individual amounts and integers taken from the original sources in the order of their appearance thereon, but without indicating the particular denomination or classification of the amounts. There is thus provided a means for checking the amounts registered against the amounts in the original sources, although there is no record of the particular registering units that receive the particular sums, although the original sources would show where they should have gone. I shall, however, provide a registering unit for making periodic verification of amounts passed to the several registering units by having a special registering unit work simultaneously with each registering unit, such as "A" and "B". While I have not shown such a unit in the drawings, or the wiring diagrams, it will be understood that one of my registering units may be connected in a circuit, so that it will record the grand total of the amounts recorded on other registering units, which will be described more fully hereinafter.

In recording the next amount, "431", upon the registering unit "A", through depressing the keys 2, marked "1", "3", and "4", in the order stated, the amount appearing in the window 304, would be changed from "369" to "800". The course of the electric currents would follow exactly as described in the case of the registration of the figures of the amount "369", for corresponding positions.

However, it is evident that there was a sufficient number of step-forward actuations to cause the disc in both the "units" and "tens" digit position to pass the "9," and come to rest with a "0" showing in the window 304. In both of these instances, a situation was created where the cumulating process required the actuation of the disc in the position just ahead, that is, one digit higher, one step to provide for the "carry over," that is normally faced in all columnar addition processes.

As shown in Fig. 27, certain additional circuits have been provided, which function as described below. When the number "9", appearing in the window 304 (Fig. 18) of registering unit "A" following termination of the registration of the first amount, "369", was changed to "0", in connection with the depressing of the key 2, for the number, "1", the contacts 380 and 382 in the "units" digit position were closed by the lug 378. At the moment this contact was made, a circuit was completed leading to binding posts U3 and U4. As the units digit disk U306 turns from the number "9" to "0", the contact point U378 will pass between the contacts U380 and U382 and consequently the binding-posts U3 and U4 will be connected together in a circuit. From the binding-post U3 a wire extends to the magnet of the relay 462, and from the other end of the coils of this magnet a wire is connected with the binding-post T1. As a result of these connections, the positive side of both the battery X and the battery Y will be connected with the binding-posts U3 and U4 since the positive side of these batteries is connected with the binding-post T1 as described above. From the binding-post U4 a wire is connected with the contact point 462' of the relay 462, which relay will be energized immediately upon the contact point U378 passing between the contacts U380 and U382. From the contact point 462', a wire extends directly across to the contact brush 102 and contact plate 98 which contact plate is connected directly with the negative pole of the battery Y.

After the relay 462 has been energized as described above, the contact 462" is also made, and from this contact a wire extends to the binding-post T5 and consequently a connection is made through the magnet T320 since the binding-post T1 and the binding-post T5 are connected as described above with the positive and negative poles, respectively, of the battery X. In this manner, one impulse is given to the magnet T320 and as a result the disk T306 is rotated one step.

After this operation, the amount indicated in the windows 304, of recording unit "A" would be "370", and the recording thereon in the "tens" digit position of the figure "3" from the number "431" would result in a change to "400", since there would be another "carry over" operation, from the "tens" to the "hundreds" digit position, when the disc in the "tens" digit position passes from "9" to "0." The recording of the left-hand figure "4", of the amount "431", would cause the amount appearing in the windows to be "800." Since an explanation of the courses followed by the electric current in the progressive operations over the same or parallel circuit would duplicate the description heretofore given, none will be undertaken.

*Corrections of erroneous registrations*

Since there will be times when a correction will be necessary of a registration previously made, means have been provided to single out specific digit discs in a particular registering unit. This is accomplished by using the push buttons 470, 472, and 474, and the switch 600 (Fig. 27). It is apparent that the opening of the switch 600 will nullify the making of contact at 140 and 142, and thereby make inoperative the revolving drum 270, and consequently the switches 297, 298, and 299. There would then be no possibility of making a circuit between the 12 volt battery and the magnets 320 and 396, unless a contact happened to be maintained at one of the switches 297, 298, or 299, at the time the switch 600 was opened. In such an event that connection would have to be broken if a correction were to be undertaken in a disc not then in circuit through a contact at either switch 297, 298, or 299. When a correction is to be made, the contacts at these switches are all broken, and as a result of the contacts at the switches 297, 298 and 299, all being broken, the depressing of the desired key of switch 470, 472, or 474, will close the circuit to the desired digit disc position and the operation of the appropriate key, 2, would rotate that selected disc the number of steps represented by the key 2, depressed.

*Synchronized special registering unit*

It is apparent that in actual use this accounting machine may be made to serve just as an adding machine, with which a listing tape would be used.

The foregoing explanations disclose how the accounting machine may be increased in capacity, merely by increasing the number of registering units to the extent desired, and providing the requisite selective switch board for singling out particular registering units, upon which a single or any number of amounts of like denominations or classifications, are to be summed up into a total for each. All of these totals are available immediately, at the moment of making the last registration, be it at the close of a day, week, year, or any other period of continuing operation.

This process of bringing together into individual totals the great number of single amounts from various original sources, makes it desirable to have some periodic check upon the accuracy of the amounts registered. In order to provide this step-by-step check, I provide a special registering unit similar in construction to either the "A" type, or the "B" type, except for the relays 460, which are synchronized with each other registering unit selected, so that at all times there will be simultaneous registrations on two registering units. This special registering unit would be reset to "zero" as often as desired, independently of the regular registering units, and would cumulate successively the amounts from a particular source whenever there was an independent total for a group of amounts of the same or mixed denominations, or classifications, which were being directed to their proper groupings in the multiple bank of registering units. When the last of a particular group of amounts had been registered, the special registering unit would show a total, which would, if the transcriptions had been properly carried out, be in agreement with the total of the original record. If a difference appeared, the error would be detected in a checkback of the amounts on the printer tape against the original source.

This special registering unit would function on separate, 12 and 3.5 volt batteries, and separate contacts 100 and 104, 98 and 102, 297, 298, and 299, with relays like 462, but none like 460, which latter relay would be displaced by direct wire circuits. There would be independent circuits leading to contacts 140 and 142 to rotate a separate drum similar to the drum 270, for making contacts similar to the contacts 297, 298, and 299. Resetting to "zero" would be conveniently performed under the mechanical process outlined hereinbefore, regardless of how the regular registering units were reset.

Push button contact switches 470, 472 and 474 may be used, as described above, as an alternative means for the re-setting of the dials to a zero position in connection with the use of my modified form of registering unit (the unit "B"). When these push-button contacts are used, the position of the contacts at the shiftable switch 500, as shown in Fig. 25, must be changed so that the contact arms will meet the points immediately above those at which the contact is made in Figs. 25 and 27. The shifting of the arms is effected by means of a bar, which is not shown on the drawings, positioned near the front of the master unit and just behind the push-button switches.

If it is desired to use the push buttons in connection with resetting the dials to zero in my modified form of registering unit, these push buttons would be depressed progressively, starting with the "units" digit. While the push-button 470 is thus held in a depressed condition, the key 2 of the master unit for the number "9" is depressed, thus affording nine electrical impulses to the selected dial of a previously selected registering unit. The nine pulsations resulting from the depression and release of the key 2, representing the number "9" will operate the electromagnet for the selected dial a sufficient number of times to turn that dial until the number showing through the window 384 appears as "zero." At the time that the disk has been stepped forward or backwards a sufficient number of steps for the zero to appear at the window 384, the brush 454 will have assumed its position within the notch 456 of the ring 450 and the electrical connection to the electro-magnet 396 will have been broken, with the result that the electromagnet will not be further energized by any further action in connection with the depression or return of the key 2.

The same procedure may be followed in resetting the "tens" digit dial and the "hundreds" digit dial, and thus the entire registering unit will obtain a "zero" setting.

While the foregoing paragraph details the operation of the "zero" setting processes under the alternative plan of shifting the switch 500, opening switch 600 and closing circuits again through use of the push button switches 470, 472 and 474, the normal and practical method of "zero" setting operations would be to shift the switch 500, depress the lever 180 to shift the printer carriage, and then depress and return key 2, showing numeral 9 as many times as there are dials in a registering unit.

In the modified form of register (shown in Figs. 22 to 24), relays 466 and 468 similar in every respect to the relays 462 and 464 are provided to transfer a pulsation from the "units" register dial to the "tens" register dial or from the "tens" register dial to the "hundreds" register dial at a time that the lower digit register dial turns from a "9" to a "zero." It will be obvious that the necessary electrical pulsation to the relays 466 and 468 will be afforded by the contact point 444 bridging the space between the electrical brushes 446 and 448 to energize the relay 466 or 468 at a proper time. The relays 466 and 468 are identical in construction with the relays 462 and 464, and are provided with the electrodes 466' and 468'', for connecting 3.5 volt circuits and 12 volt circuits in the same manner as described above.

The wiring diagram (Fig. 26) discloses the modified form of register on the right hand side of the sheet. The wiring for this modified form of register is substantially identical with the preferred form as described above and as disclosed more clearly in Fig. 27. In Fig. 26, the wiring diagram discloses contacts which have been identified as U488, U446, T448, T446, H448, and H446, positioned from right to left. These contact points are substantially the equivalent of the contact points U, T, H382 and 380 in my preferred form, but are designed slightly differently. In addition to these contact points, I also provide contact points U452, U454, T452, T454, H452 and H454. This latter set of contact points is adapted to be used in connection with the zero setting of the modified form of register. For this purpose, the register dial 386 (not shown in the wiring diagram) is provided with a metallic ring which is positioned around the shaft 390 and of sufficient width so that the brushes 452 and 454 may both be in contact with the ring 450 during the complete revolution of the register dial 386, except at any time when the registering dial 386 displays a zero through the window 384 (position shown in Fig. 24), at which time the end of the brush 454 which is normally in contact with the ring 450 is in registry with notch 456 in the ring 450, and, therefore, the electric contact between the brushes 452 and 454 is broken. These brushes 452 and 454 and their associated electrical connections are utilized in the electric zero setting of this modified form of registering unit.

When a zero setting of the modified form of register is to be made, the switch 500 is shifted so that the three contact arms will disengage the wires connected with the units, tens and hundreds register, as shown in Fig. 27, and will engage the wires leading to these units, tens and hundreds registers by the use of an independent set of wires. This set of wires is indicated on the wiring diagram for the modified form of registering unit at the upper left hand corner of Fig. 26 and also at the upper left hand corner of the particular wiring diagram for the modified form of register, the register "B."

At the time that a zero setting it to be made, and the switch 500 has been shifted to connect the zero setting, the independent wires for the independent setting, the unit selecting switches 297, 298, 299, are disengaged, and, therefore, the selection of the digit to be recorded must be made by utilizing the push-button switches 470, 472 and 474 for the units, tens and hundreds digits, respectively.

In operating the modified form of register, the current will flow exactly as described above for the preferred form, with the exception of a time at which a zero setting is to be obtained. When such a zero setting is desired, current will flow in the manner described above through the units register magnet U369 and will record as many of the nine pulsations as are necessary to revolve the register disk 386 until a zero shows through a window 384. At the time that zero is thus showing, a circuit will be broken by the disconnection of the brushes U452 and U454, and consequently the magnet U396 will no longer become energized.

The same procedure will be followed to revolve the register disk 386 for the tens digit and for the hundreds digit, so that a complete zero setting may be obtained.

While I have not shown all of the necessary electrical connections in the drawings, it is believed that any mechanic skilled in the art would understand how these connections could be easily made.

It will be understood that while tabulating the numbers on any particular selected registering unit and at the same time typing the number being registered on a printing tape, the start of the tabulation will be from the right, that is, in the "units" digit. While continuing the operation of tabulating a given number the "tens" digit will follow, then the "hundreds" digit, the "thousands" digit, and so on.

While the mechanism which I have described and illustrated is designed for handling three digit numbers only, it will be obvious that by slight modifications numbers having more digits may be tabulated and recorded in the manner described above.

It will also be understood that while I have shown connections for only two separate registering units any number of separate registering units may be utilized by merely increasing the number of units and switches, whereby the electric relays for the selected registering unit may be energized to connect that registering unit with the master unit.

While I have carefully and specifically described the construction of my device as disclosed in the drawings, it will be understood that many changes in the physical aspects of the machine may be made from time to time when it becomes necessary when manufacturing this machine for commercial use. The machine as described and disclosed in the drawings is an actual working machine but many minor details may be slightly modified without departing from the spirit of the invention in any manner.

I claim:

1. The combination of numeral keys adapted to move variably in accordance with their respective values, an electric impulse transmitting switch movable with the keys and variable as determined by the values thereof, a speed controlling device for governing the speed of actuation of the switch, pawls positioned by the keys variably as determined by the values thereof, one cooperating with one part of the controlling device for governing the speed of movement of the keys and switch in one direction and the other the speed of movement of these elements in the other direction.

2. In a registering machine, the combination of numeral keys adapted to move variably in accordance with their respective values, an impulse switch for transmitting current by impulses movable variably as determined by the values of the keys actuated, two power driven reversely moving governing devices for controlling the frequency of the current impulses, pawls adapted to be positioned variably as determined by the value of the keys, one for cooperating with one of the controlling devices for governing the speed of movement of the keys and switch in one direction, and the other for governing the speed of movement of these elements in the other direction.

3. An electric impulse switch movable away from and back to a normal position for supplying current intermittently, a shaft on which said switch is mounted, numeral keys geared to the shaft and adapted to move variably in accordance with their respective values and to operate the impulse switch accordingly, an arm mounted on the shaft, pawls carried by said arm, and independently operated speed controlling means for governing the speed of movement of the numeral keys, pawls, arm, shaft, and switch.

4. An electric impulse switch movable away from and back to a normal position for supplying current intermittently as it moves in both directions, a shaft on which said switch is mounted, numeral keys geared to said shaft and adapted to be depressed variably in accordance with their respective values and to operate the impulse switch accordingly, an arm mounted on said shaft, pawls carried by said arm, and power driven independently operated speed controlling ratchet means engaging said pawls for governing the speed of movement of the numeral keys first on their depression and then on their return.

5. An electric impulse switch movable away from and back to a normal position for supplying current intermittently, a shaft on which said switch is mounted, numeral keys geared to said shaft and adapted to be depressed variably in accordance with the values thereof, an arm secured to said shaft, pawls carried by said arm, means for restoring the switch, the keys, and the shaft, power driven means engaging one pawl for governing the speed of depression of the keys, and other power driven means engaging another pawl for governing the speed of restoration of the switch, keys and shaft.

ROY W. FLETCHER.